United States Patent
Horn

(10) Patent No.: US 8,977,257 B2
(45) Date of Patent: Mar. 10, 2015

(54) METHOD AND APPARATUS TO CONTROL VISITED NETWORK ACCESS FOR DEVICES

(75) Inventor: Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 13/031,035

(22) Filed: Feb. 18, 2011

(65) Prior Publication Data

US 2011/0217978 A1    Sep. 8, 2011

Related U.S. Application Data

(60) Provisional application No. 61/311,215, filed on Mar. 5, 2010, provisional application No. 61/430,676, filed on Jan. 7, 2011.

(51) Int. Cl.
*H04W 4/00* (2009.01)
*H04W 8/06* (2009.01)
*H04W 4/06* (2009.01)

(52) U.S. Cl.
CPC .. *H04W 8/06* (2013.01); *H04W 4/06* (2013.01)
USPC ............ 455/433; 455/435.1; 455/435.2; 455/435.3; 455/458; 370/310; 370/357

(58) Field of Classification Search
CPC ..... H04W 48/08; H04W 48/10; H04W 48/12; H04W 48/14; H04W 48/18; H04W 8/10; H04W 8/12; H04W 60/00; H04W 60/06
USPC .................................. 455/435.1–435.3, 458
See application file for complete search history.

(56) References Cited

U.S. PATENT DOCUMENTS

2008/0285492 A1    11/2008    Vesterinen
2009/0070694 A1    3/2009    Ore et al.
(Continued)

FOREIGN PATENT DOCUMENTS

JP    2008544596 A    12/2008
JP    2009510969 A    3/2009
(Continued)

OTHER PUBLICATIONS

3rd Generation Partnership Project; Technical Specification Group Services and System Aspects; 3GPP system to Wireless Local Area Network (WLAN) interworking; System description (Release 8), 3GPP Standard; 3GPP TS 23.234, 3rd Generation Partnership Project (3GPP), Mobile Competence Centre ; 650, Route Des Lucioles ; F-06921 Sophia-Antipolis Cedex ; France, No. V8.0.0, Dec. 1, 2008, pp. 1-85, XP050363357.
(Continued)

*Primary Examiner* — Wayne Cai
(74) *Attorney, Agent, or Firm* — Françcois A. Pelaez

(57) ABSTRACT

Methods and apparatuses are provided that facilitate controlling device access to one or more restricted groups of access points in a visited network. An indicator can be provided by a home network that specifies whether a device registering with a visited network is allowed to access restricted groups in the visited networks. If so, the visited network can request restricted group subscription information for the device. Additionally or alternatively, the device can control whether restricted groups are displayed for selecting access points based on one or more indicators regarding whether the device is allowed to access restricted groups in visited networks.

25 Claims, 18 Drawing Sheets

(56) References Cited

U.S. PATENT DOCUMENTS

| | | | |
|---|---|---|---|
| 2009/0093232 A1 | 4/2009 | Gupta et al. | |
| 2010/0210288 A1 | 8/2010 | Kim et al. | |
| 2010/0238920 A1* | 9/2010 | Salkintzis et al. | 370/357 |
| 2010/0291927 A1* | 11/2010 | Wu et al. | 455/435.3 |
| 2012/0057574 A1 | 3/2012 | Horn | |

FOREIGN PATENT DOCUMENTS

| | | |
|---|---|---|
| JP | 2011501917 | 1/2011 |
| JP | 2011515879 A | 5/2011 |
| WO | WO-2006133720 A1 | 12/2006 |
| WO | WO-2007040449 A1 | 4/2007 |
| WO | WO-2009048888 A2 | 4/2009 |
| WO | WO-2009063434 A1 | 5/2009 |
| WO | WO-2009116409 A1 | 9/2009 |

OTHER PUBLICATIONS

3rd Generation Partnership Project; Technical Specification Group Services and System Aspects; Service requirements for Home NodeBs and Home eNodeBs (Release 10), 3GPP Standard; 3GPP TS 22.220, 3rd Generation Partnership Project (3GPP), Mobile Competence Centre ; 650, Route Des Lucioles ; F-06921 Sophia-Antipolis Cedex ; France, No. V10.1.0, Dec. 18, 2009, pp. 1-23, XP050401071, [retrieved on Dec. 18, 2009].

Deutsche Telekom et al., "Add VPLMN CSG support for Rel-10", 3GPP Draft; S1-100453, 3rd Generation Partnership Project (3GPP), Mobile Competence Centre; 650, Route Des Lucioles; F-06921 Sophia-Antipolis Cedex; France, vol. SA WGl, No. SanFrancisco; 20100222, Mar. 1, 2010, XP050431826, [retrieved on Mar. 1, 2010].

International Search Report and Written Opinion—PCT/US2011/027292, ISA/EPO—Sep. 5, 2011(101125U1WO).

LTE; General Packet Radio Service (GPRS) enhancements for Evolved Universal Terrestrial Radio Access Network (E-UTRAN) access (3GPP TS 23.401 version 9.3.0 Release 9), Technical Specification, European Telecommunications Standards Institute (ETSI), 650, Route Des Lucioles; F-06921 Sophia-Antipolis; France, No. V9.3.0, Jan. 1, 2010, XP014045280, chapter 1 "Scope" chapter 4.2.2 "Roaming architecture" chapter 4.3.13 "Closed Subscriber Group functions" chapter 5.3.3 "Tracking Area Update procedures".

Qualcomm Europe: "Key aspects: P-GW/GGSN location principles for LIPA and SIPTO traffic" 3GPP Draft; S2-095088, 3rd Generation Partnership Project (3GPP), Mobile Competence Centre : 650, Route Des Lucioles ; F-06921 Sophia-Antipolis Cedex ; France, No. Kyoto; 20090904, Aug. 28, 2009, XP050396618, [retrieved on Aug. 25, 2009].

3GPP Technical Specification Group Serveice and System Aspects; GPRS enhancements for E-UTRAN access (Release 9), 3GPP TS 23.401, V9.3.0, Dec. 2009, URL: http://www.3gpp.org/ftp/Specs/archive/23_series/23.401/23401-930.zip.

European Search Report—EP13184644—Search Authority—The Hague—Oct. 4, 2013 (101125U1EPD1).

* cited by examiner

METHOD AND APPARATUS TO CONTROL VISITED NETWORK ACCESS FOR DEVICES

CLAIM OF PRIORITY UNDER 35 U.S.C. §119

The present Application for Patent claims priority to Provisional Application No. 61/311,215 entitled "METHOD AND APPARATUS TO ENABLE AUTONOMOUS VISITED PUBLIC LAND MOBILE NETWORK (VPLMN) CLOSED SUBSCRIBER GROUP (CSG) ROAMING" filed Mar. 5, 2010, and assigned to the assignee hereof and hereby expressly incorporated by reference herein, as well as Provisional Application No. 61/430,676 entitled "METHOD AND APPARATUS TO ENABLE AUTONOMOUS CLOSED SUBSCRIBER GROUP (CSG) ROAMING AND/OR LOCAL INTERNET PROTOCOL ACCESS (LIPA)" filed Jan. 7, 2011, and assigned to the assignee hereof and hereby expressly incorporated by reference herein.

BACKGROUND

1. Field

The following description relates generally to wireless network communications, and more particularly to communicating with nodes in a restricted group.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, wireless relay stations and low power base stations (e.g., which can be commonly referred to as access point base stations, Home NodeBs or Home eNBs, collectively referred to as H(e)NB, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs provide closed subscriber group (CSG) access that restricts access to certain devices or related users that are members of the CSG. A home subscriber server (HSS), home location register (HLR), or one or more other nodes of a device's home network can store CSG membership information.

H(e)NBs can be deployed by various network operators, and thus devices can attempt access to, and indeed be provisioned at, one or more H(e)NBs at a visited network. In this regard, one or more nodes of a visited network can request CSG membership information from the HSS, HLR, etc. at a device's home network to determine whether the device is able to access a CSG on the visited network, to provision the device at the CSG on the visited network, etc. In one example, a CSG subscription server (CSS) is provided in the visited network, or otherwise coupled with one or more nodes of the visited network, to store visited network CSG subscription information for the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with controlling device access to restricted group nodes in a visited network at the home network, at the device, and/or the like. For example, a home network of a device can specify an indicator related to allowing the device membership to restricted groups of access points in the visited network. For example, a network node in the visited network can utilize the indicator to determine whether to obtain restricted group subscription information for the device. In another example, a device can control whether to display one or more restricted group access points of a visited network in a list for manual selection based at least in part on one or more indicators. For example, the device can obtain an indicator that relates to specifying any restricted group access points of visited networks, an indicator that relates to specifying restricted group access points of certain specific visited networks, and/or the like.

According to an example, a method for provisioning closed subscriber group (CSG) information for a device communicating in a visited network is provided including receiving an indication from a visited network related to registering a device on the visited network. The method also includes sending one or more parameters in response to the indication along with a CSG roaming indicator that specifies whether the device is allowed to access one or more CSGs at the visited network.

In another aspect, an apparatus for provisioning CSG information for a device communicating in a visited network is provided that includes at least one processor configured to receive an indication from a visited network related to registering a device on the visited network. The at least one processor is further configured to send one or more parameters in response to the indication along with a CSG roaming indicator that specifies whether the device is allowed to utilize autonomous CSG roaming at the visited network. In addition, the apparatus includes a memory coupled to the at least one processor.

In yet another aspect, an apparatus for provisioning a CSG is provided that includes means for receiving an indication from a visited network related to registering a device on the visited network. The apparatus further includes means for sending one or more parameters in response to the indication along with a CSG roaming indicator that specifies whether the device is allowed to utilize autonomous CSG roaming at the visited network.

Still, in another aspect, a computer-program product for provisioning CSG information for a device communicating in a visited network is provided including a computer-readable medium having code for causing at least one computer to receive an indication from a visited network related to registering a device on the visited network. The computer-readable medium further includes code for causing the at least one computer to send one or more parameters in response to the indication along with a CSG roaming indicator that specifies whether the device is allowed to utilize autonomous CSG roaming at the visited network.

Moreover, in an aspect, an apparatus for provisioning a CSG is provided that includes a visited network registering component for receiving an indication from a visited network related to registering a device on the visited network. The apparatus further includes a CSG roaming indicating component for sending one or more parameters in response to the indication along with a CSG roaming indicator that specifies whether the device is allowed to utilize autonomous CSG roaming at the visited network.

According to another example, a method for obtaining CSG information for a device communicating in a visited network is provided that includes receiving subscription information for a device along with a CSG roaming indicator that specifies whether the device is allowed to access CSGs in a visited network and determining whether to request CSG subscription information for the device based at least in part on the CSG roaming indicator.

In another aspect, an apparatus for obtaining CSG information for a device communicating in a visited network is provided that includes at least one processor configured to receive subscription information for a device along with a CSG roaming indicator that specifies whether the device is allowed to utilize autonomous CSG roaming in a visited network. The at least one processor is further configured to determine whether to request CSG subscription information for the device based at least in part on the CSG roaming indicator. In addition, the apparatus includes a memory coupled to the at least one processor.

In yet another aspect, an apparatus for obtaining CSG information for a device communicating in a visited network is provided that includes means for receiving subscription information for a device along with a CSG roaming indicator that specifies whether the device is allowed to utilize autonomous CSG roaming in a visited network. The apparatus further includes means for determining whether to request CSG subscription information for the device based at least in part on the CSG roaming indicator.

Still, in another aspect, a computer-program product for obtaining CSG information for a device communicating in a visited network is provided including a computer-readable medium having code for causing at least one computer to receive subscription information for a device along with a CSG roaming indicator that specifies whether the device is allowed to utilize autonomous CSG roaming in a visited network. The computer-readable medium further includes code for causing the at least one computer to determine whether to request CSG subscription information for the device based at least in part on the CSG roaming indicator.

Moreover, in an aspect, an apparatus for obtaining CSG information for a device communicating in a visited network is provided that includes a device registering component for receiving subscription information for a device along with a CSG roaming indicator that specifies whether the device is allowed to utilize autonomous CSG roaming in a visited network. The apparatus further includes a CSG roaming determining component for determining whether to request CSG subscription information for the device based at least in part on the CSG roaming indicator.

In another example, a method for determining a set of CSG cells to display is provided that includes detecting signals from one or more neighboring CSG cells and receiving one or more indicators that specify whether access is allowed to CSGs in one or more visited networks. The method further includes determining whether to display an identifier of one or more CSGs related to the one or more neighboring CSG cells based at least in part on the one or more indicators.

In another aspect, an apparatus for determining a set of CSG cells to display is provided that includes at least one processor configured to detect signals from one or more CSG cells and receive one or more indicators that specify whether access is allowed to CSGs in one or more visited networks. The at least one processor is further configured to determine whether to display an identifier of one or more CSGs related to the one or more CSG cells based at least in part on the one or more indicators. In addition, the apparatus includes a memory coupled to the at least one processor.

In yet another aspect, an apparatus for determining a set of CSG cells to display is provided that includes means for detecting signals from one or more CSG cells and means for receiving one or more indicators that specify whether access is allowed to CSGs in one or more visited networks. The apparatus further includes means for determining whether to display an identifier of one or more CSGs related to the one or more CSG cells based at least in part on the one or more indicators.

Still, in another aspect, a computer-program product for determining a set of CSG cells to display is provided including a computer-readable medium having code for causing at least one computer to detect signals from one or more CSG cells and code for causing the at least one computer to receive one or more indicators that specify whether access is allowed to CSGs in one or more visited networks. The computer-readable medium further includes code for causing the at least one computer to determine whether to display an identifier of one or more CSGs related to the one or more CSG cells based at least in part on the one or more indicators.

Moreover, in an aspect, an apparatus for determining a set of CSG cells to display is provided that includes a neighboring access point detecting component for detecting signals from one or more CSG cells and a visited public land mobile network (VPLMN) component for receiving one or more indicators that specify whether access is allowed to CSGs in one or more visited networks. The apparatus further includes a list generating component for determining whether to display an identifier of one or more CSGs related to the one or more CSG cells based at least in part on the one or more indicators.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
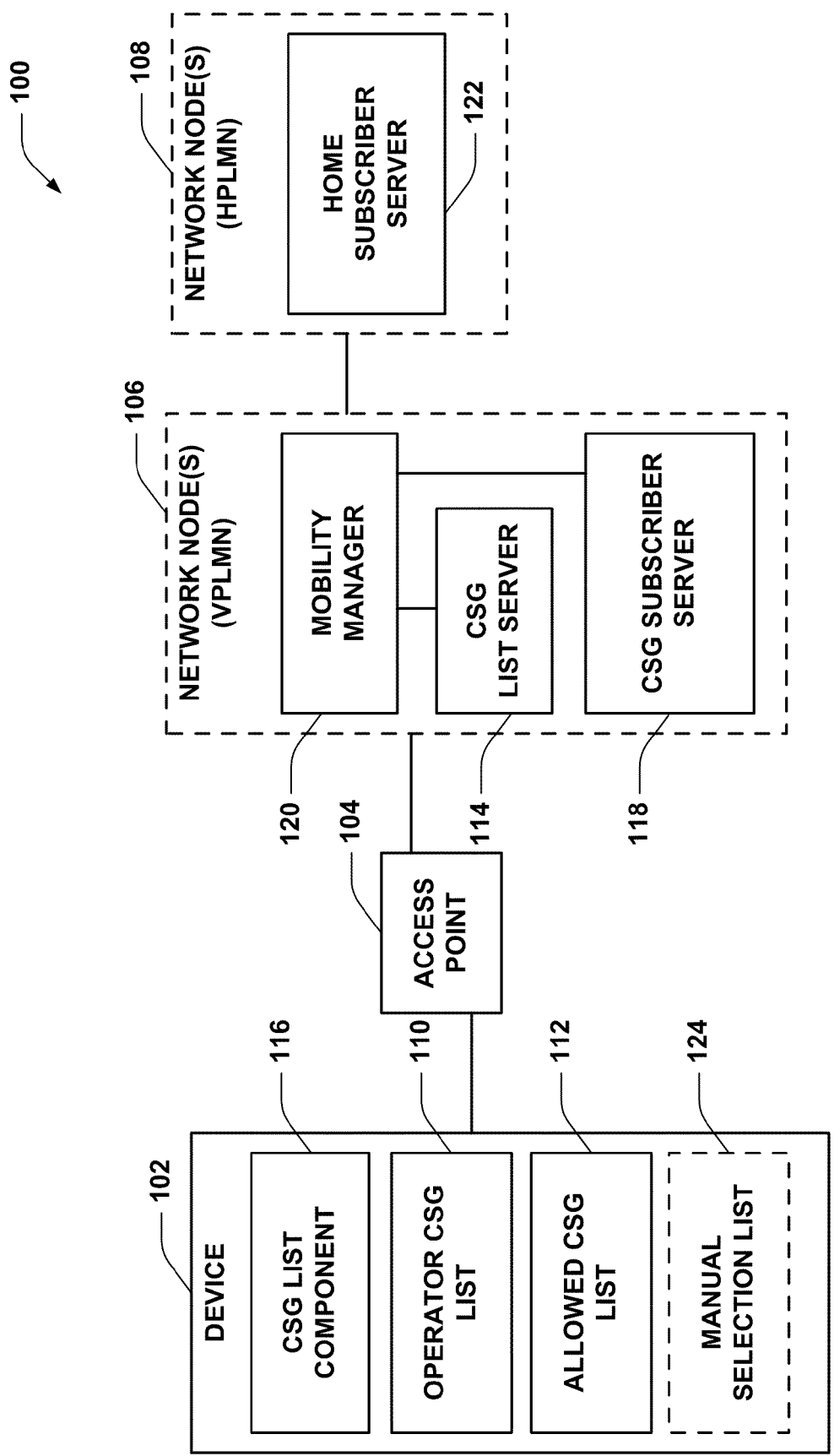
FIG. 1 is a schematic block diagram of an aspect of a system for controlling device access to restricted group nodes in a visited network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, one or more indicators can be communicated and processed to determine behavior related to allowing device membership to restricted group nodes on a visited network. For example, a node of a home network for a device can communicate an indicator to a node of a visited network that specifies whether the device is allowed to become a member of restricted groups of access points or other nodes at the visited network (e.g., in order to access the restricted group of access points to receive at least some level of service) where membership to the restricted group is not provisioned by the home network. The node of the visited network can utilize this indicator to determine whether to request restricted group subscription information for the device from one or more of a subscription server at the visited network, a node at the home network, or the like. Moreover, for example, a device can obtain one or more parameters related to whether to display any restricted group access points of a visited network, display restricted group access points of one or more specific visited networks, etc. in a list for manual selection by a user of the device. In this regard, restricted group access point selection ability can be controlled at the home network, at the device, and/or the like.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated are several nodes of a sample communication system 100. For illustration purposes, various aspects of the disclosure are described in the context of one or more devices, access points, and network nodes that communicate with one another. It is to be appreciated, however, that aspects herein may be applicable to other types of apparatuses or other similar apparatuses that are referenced using other terminology. For example, access points can be referred to or implemented as base stations, eNodeBs (eNB), Home Node Bs (e.g., in UMTS) or Home eNBs (e.g., in LTE), collectively referred to as H(e)NBs, femtocell or picocell access points, mobile base stations, relay nodes, hot-spots, routers, gateways, etc., while devices may be referred to or implemented as user equipment (UE), mobile devices, access terminals, modems (or other tethered devices), and so on.

Access points in the system 100 provide one or more services (e.g., network connectivity) for one or more wired or wireless devices (e.g., device 102) that can be installed within or that can travel throughout a coverage area of the system 100. For example, at various points in time device 102 can connect to an access point 104 or some other access point in the system 100 (not shown). Each of these access points can communicate with one or more network nodes (represented, for example, by network node(s) 106 and 108) to facilitate wide area network connectivity. Network nodes 106 and 108 can take various forms such as, for example, one or more radio and/or core network entities. Thus, in various examples, network nodes 106 and 108 can represent functionality such as at least one of: network management (e.g., via an operation, administration, management, and provisioning entity), call control, session management, mobility management, gateway functions, interworking functions, or some other suitable network functionality.

In some cases, device 102 can access a restricted group access point associated with a wireless cell set. In general, a wireless cell set comprises a set of one or more cells (e.g., provided by at least one access point) where there is a defined relationship specific to that set. An example of a wireless cell set is a closed subscriber group (CSG). For convenience, the discussion that follows may simply refer to the term CSG, rather than the more general term wireless cell set. It should be appreciated, however, that the described concepts may be applicable to other types of defined sets or groups (e.g., restricted groups) of wireless cells or other similar entities. Also, restricted groups can provide a diminished level of access to non-members (e.g., hybrid cells), to which aspects described herein can apply as well. In addition, it is to be appreciated that an access point can provide one or more cells within which devices can communicate with the access point.

As device 102 travels throughout a network, device 102 can use some form of list (e.g., an allowed list or whitelist) of CSGs and/or related access points to identify the access points that device 102 is allowed to access. In one example, this list can be maintained by the network (e.g., one or more of network nodes 106 or 108), such that the network can periodically send messages to device 102 to update the list. This list can be referred to as an operator CSG list 110. Device 102 can also maintain a local list of CSGs and/or related access points, since the network list may be updated according to a schedule (e.g., once a day, based on device 102 connecting to the network, etc.). In addition, the local list allows device 102 to update the list with CSGs or related access points that are manually selected and provisioned. The local list can be referred to as an allowed CSG list 112. It is to be appreciated that the network can also update the allowed CSG list 112 (e.g., when updating the operator CSG list), for example.

For example, operator CSG list 110 can be updateable by one or more of network nodes 106 or 108, such as a CSG list server 114. For example, as the network obtains information about which CSGs the access terminal 102 is allowed to access (and/or according to a schedule or one or more other events, as described), CSG list server 114 can send a message to device 102 instructing to update the operator CSG list 110. CSG list component 116 can obtain the message and accordingly update operator CSG list 110. Allowed CSG list 112 is updateable by a user of device 102. For example, device 102 can perform manual selection of one or more CSG access points or related CSGs, and device 102 (e.g., via CSG list component 116) can update the allowed CSG list 112 where device 102 is permitted access to an access point associated with a CSG identifier that is not currently present in the operator CSG list 110.

Thus, device 102 can then use both lists to determine whether at least some level of access to one or more CSGs is allowed while in the home network or roaming in a visited network. System 100 can comprise more than one network (e.g., different public land mobile networks (PLMN)). In one example, device 102 and network nodes 108 can be of a home PLMN (HPLMN) of device 102, and the access point 104 and the network node(s) 106 can be of a visited PLMN (VPLMN), which is also referred to herein as a visited network. Thus, for example, device 102 can attempt to establish connection with access point 104, which can be a CSG access point in the VPLMN. In this example, one or more of network nodes 106, such as mobility manager 120, can communicate with one or more of network nodes 108 in the HPLMN to register device 102 on the VPLMN, and can obtain some subscription information regarding device 102 and/or a user (e.g., subscriber) thereof.

In one example, one or more network nodes 108 of the HPLMN can provide CSG subscription information related to device 102 to the one or more network nodes 106 of the VPLMN (e.g., by including CSG subscription information along with other subscription information transferred from the network nodes 108 of the HPLMN to the network nodes 106 of the VPLMN when the device 102 registers in the visited network). CSG subscription information can include a list of one or more CSGs (e.g., identifiers thereof) to which device 102 is a member. In another example, the CSG subscription information can include a level of access and/or other parameters regarding device membership at the one or more CSGs. In one example, the CSG subscription information can include membership information related to one or more CSGs in the VPLMN, and thus the subscription information can additionally include the PLMN related to the one or more CSGs.

In one example, home subscriber server (HSS) 122 can additionally provide a CSG roaming indicator related to device 102 to mobility manager 120 to facilitate determining whether device 102 is allowed autonomous CSG roaming in the VPLMN. For example, autonomous CSG roaming can refer to device 102 being allowed membership to and/or access of CSG access points in the VPLMN. These can be CSGs and/or related access points for which membership is not already provisioned in the CSG subscription information received from the HSS 122. Where the CSG roaming indicator specifies that device 102 is allowed to perform autonomous CSG roaming, mobility manager 120 can request and maintain additional CSG subscription information related to the VPLMN for device 102.

Where mobility manager 120 communicates CSG subscription information with HSS 122, however, this can require an interface between nodes of the VPLMN and HPLMN to request such information, support for VPLMN roaming at the HPLMN, etc. Thus, in one example, CSG subscription server (CSS) 118 can be provided at the VPLMN to maintain CSG subscription information for roaming devices. In this regard, mobility manager 120 can communicate CSG subscription information for device 202 at the VPLMN with CSS 118. When device 102 requests to establish a connection at an access point that is a member of a CSG (e.g., access point 104), mobility manager 120 can determine whether device 102 is allowed access according to the received CSG subscription information for device 102. Similarly, when a device 102 is provisioned at a CSG access point in the VPLMN (e.g., access point 104), CSS 118 can store the provisioning information. Mobility manager 120 can then determine whether to allow device 102 to establish a connection at the access point 104 based on whether the CSG subscription information for the device 102 related to the VPLMN indicates that access to access point 104 and/or membership in the CSG of the access point 104 is allowed.

In another example, the CSG list component 116 can optionally generate a manual selection list 124 for display to a user of device 102. For example, CSG list component 116 can detect signals from neighboring access points and/or provided cells and can determine whether to display at least a portion of the neighboring access points, or related CSG identifiers, in the manual selection list 124. In one example, CSG list component 116 can obtain one or more indicators that specify whether to include any CSGs from VPLMNs in the manual selection list 124, whether to include CSGs from certain VPLMNs, and/or the like. Similarly, the indicators can relate to whether to display CSGs from the VPLMNs that are not in an operator CSG list received from the HPLMN. For example, device 102 can store the indicators (e.g., as a hard-coded parameter, parameter in a configuration or specification, etc.), receive the indicators from one or more network nodes 106 and/or 108, and/or the like.

In any case, for example, where CSG list component 116 determines an indicator is set that specifies to not include any CSGs from VPLMNs, CSG list component 116 can exclude access point 104, and/or a related CSG identifier, from the manual selection list 124. Similarly, where CSG list component 116 determines an indicator is set that specifies to not include CSGs from the VPLMN of network nodes 106 and access point 104, CSG list component 116 can exclude access point 104, or a related CSG identifier from manual selection list 124. Otherwise, CSG list component 116 can include access point 104, or a related CSG identifier, in manual selection list 124. Thus, device 102 can control whether a user can request access to one or more access points in one or more CSGs.

Figure 2:
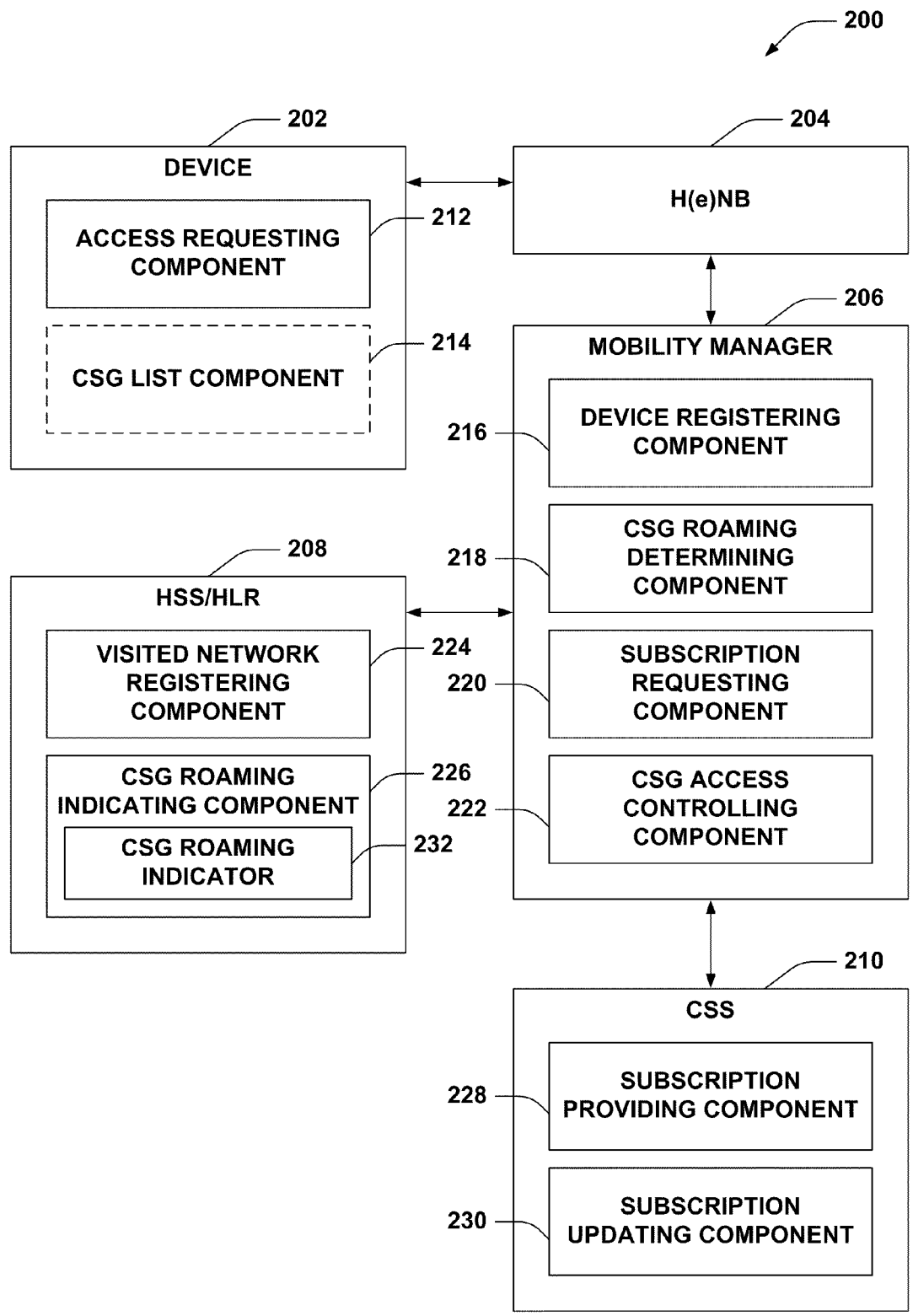
FIG. 2 illustrates an example system for controlling device access to closed subscriber groups (CSG) in a visited network from a node of a home network.

Turning to FIG. 2, an example wireless communication system 200 is illustrated that facilitates requesting CSG subscription data for a device roaming at a visited network. System 200 can include a device 202 that can communicate with one or more access points to receive access to a wireless network, an H(e)NB 204 that provides restricted access to one or more devices, and a mobility manager 206 that authorizes one or more devices to communicate with one or more core network components. System 200 can additionally comprise a HSS/home location register (HLR) 208 related to the device 202, and a CSS 210 that maintains CSG subscription information for one or more devices. In one example, device 202 can be a UE, modem (or other tethered device), a portion thereof, and/or the like, and H(e)NB 204 can be a femtocell, picocell, or similar access point, a portion thereof, etc., as described. In addition, for example, mobility manager 206 can be a mobility management entity (MME), serving general packet radio service (GPRS) support node (SGSN), mobile services switching center (MSC)/visiting location register (VLR), or similar node. Moreover, it is to be appreciated that additional components or nodes can be present between those shown (e.g., one or more gateways can be present between mobility manager 206 and HSS/HLR 208, mobility manager 206 and CSS 210, etc.) to facilitate access.

Device 202 can comprise an access requesting component 212 for attempting to access one or more access points in a HPLMN or VPLMN, and an optional CSG list component 214 for processing a CSG list based at least in part on whether access is allowed to the one or more access points. Mobility manager 206 can comprise a device registering component 216 for performing a registration for one or more devices over a related PLMN, and a CSG roaming determining component 218 for discerning whether a roaming device is allowed access to CSG nodes in the PLMN related to the mobility manager 206. Mobility manager 206 also comprises a subscription requesting component 220 for obtaining CSG subscription information for a roaming device, and a CSG access controlling component 222 for providing CSG access to the roaming device based at least in part on the subscription information.

HSS/HLR 208 can comprise a visited network registering component 224 that can allow a device to be registered on a VPLMN and can provide one or more service parameters to the VPLMN for the device, and a CSG roaming indicating component 226 that can specify whether the device is allowed to communicate with CSG nodes at the VPLMN. CSS 210 can include a subscription providing component 228 for retrieving CSG subscription information for a device roaming in a VPLMN related to CSS 210 or a requesting entity, and a subscription updating component 230 for receiving and storing CSG subscription information for a device roaming in the VPLMN.

According to an example, device 202 can relate to a network operator that provides a PLMN, which can be the HPLMN for device 202. HSS/HLR 208 can additionally be a node in the HPLMN that stores subscription information for device 202. H(e)NB 204 and mobility manager 206 can be part of a PLMN provided by a different network operator, which can be a VPLMN of device 202. Access requesting component 212, however, can attempt access to one or more access points of the VPLMN, such as H(e)NB 204, and H(e)NB 204 can notify mobility manager 206 of the access attempt to facilitate authenticating/authorizing the device 202 at the VPLMN. In this example, device 202 can perform a registration or attach procedure with the VPLMN. In one example, access requesting component 212 can transmit an attach request, registration request, tracking area update (TAU), location area update (LAU), routing area update (RAU), or similar request to H(e)NB 204, and H(e)NB 204 can forward the message to mobility manager 206.

In either case, device registering component 216 can accordingly obtain one or more device 202 parameters from H(e)NB 204 (e.g., from the attach request, registration request, TAU, LAU, RAU or similar message). In this example, device registering component 216 can request registration for device 202 on the VPLMN from HSS/HLR 208. For example, this can be part of an Update Location Request, or similar message. Visited network registering component 224 can obtain the request for registering device 202, and CSG roaming indicating component 226 can provide device subscription information related to device 202 to mobility manager 206. For example, this can be part of an Update Location Request Acknowledgement message, an Insert Subscriber Data message, and/or similar messages used to provision device information in an LTE network. Device registering component 216 can receive the device subscription information for providing access to device 202 in accordance with the device subscription information. In another example, visited network registering component 224 can provide, and device registering component 216 can obtain, CSG subscription information for device 202 from the visited network registering component 224 (e.g., as part of the subscription information or otherwise).

As part of the device subscription information, and/or in other messages related to registration, attachment, etc. of device 202, CSG roaming indicating component 226 can additionally communicate a CSG roaming indicator 232 to mobility manager 206 that specifies whether device 202 is allowed membership to and/or access of CSGs or related access points (e.g., via one or more provided cells) in the VPLMN. For example, this can relate to CSGs for which membership or access is not provisioned in the CSG subscription from the HPLMN (e.g., from HSS 208). As described, in this regard, the CSG roaming indicator 232 can relate to whether device 202 is allowed to utilize autonomous CSG roaming among such CSGs in the VPLMN. In one example, CSG roaming indicating component 226 can determine and/or store the CSG roaming indicator 232 for a specific device 202. For example, the CSG roaming indicator 232 can be initialized by a network operator (e.g., via an interface to the CSG roaming indicating component 226) based at least in part on operator policy, a roaming agreement, a subscription class, a billing model, etc., which can be specific to device 202 and/or a related user/subscriber.

In addition, the CSG roaming indicator 232 can apply for a given VPLMN (and thus CSG roaming indicating component 226 can include multiple CSG roaming indicators each for a different VPLMN) or generally to any visited network. CSG roaming determining component 218 can obtain the CSG roaming indicator 232 (e.g., from the device subscription information or otherwise). Where the CSG roaming indicator 232 specifies that device 202 is allowed to utilize autonomous CSG roaming, subscription requesting component 220 can transmit a request to CSS 210 for CSG subscription information of device 202 related to one or more CSGs in the VPLMN. In one example, this can be an Update CSG Location Request message or similar message communicated in an LTE network. Subscription providing component 228 can obtain the request and can transmit CSG subscription information for device 202. In one example, this can be additional CSG subscription information related to CSGs in the VPLMN.

In this regard, for example, CSS 210 can store CSG subscription information for device 202 related to the VPLMN. In one example, CSS 210 can store the CSG subscription information based at least in part on subscription updating component 230 receiving provisioning information for device 202 regarding one or more CSGs. This provisioning information can be provided to subscription updating component 230 manually by one or more out-of-band procedures, by device 202 using one or more in-band procedures, and/or the like. For example, the one or more in-band procedures can be conditioned on whether device 202 is allowed to utilize autonomous CSG roaming. Where the CSG roaming indicator 232 specifies that device 202 is not allowed to utilize autonomous CSG roaming in the VPLMN, subscription requesting component 220 can refrain from requesting CSG subscription information from CSS 210. In any case, CSG access controlling component 222 can determine whether to allow device 202 access to a CSG related to H(e)NB 204 based at least in part on the CSG roaming indicator 232 and/or CSG subscription information received for device 202 from CSS 210. For example, where the CSG roaming indicator 232 specifies the device 202 is not allowed to utilize autonomous CSG roaming in the VPLMN, CSG access controlling component 222 can deny device 202 access to H(e)NB 204.

Moreover, in an example, CSG list component 214 can process one or more lists of CSGs according to whether access is allowed to H(e)NB 204 and/or a related CSG. As described, for example, CSG access controlling component 222 can manage access to the H(e)NB 204 and can indicate to device 202 whether access to H(e)NB 204 and/or a related CSG is allowed. Access requesting component 212 can receive an indicator of whether access is allowed. In one example, CSG access controlling component 222 can send a rejection code to device 202 where access to the H(e)NB and/or related CSG is rejected. Where access is not allowed, for example, CSG list component 214 can exclude an identifier of the H(e)NB and/or a related CSG identifier from a list of allowed CSGs provided from a non-access stratum (NAS) layer to an access stratum (AS) layer at device 202. In another example, where access is not allowed, for example, CSG list component 214 can exclude the H(e)NB and/or a related CSG identifier from a list of cells available for manual mode selection displayed by device 202, as described further herein. In either case, for example, access requesting component 212 can refrain from accessing CSG H(e)NBs (e.g., and/or hybrid H(e)NBs) in the VPLMN.

Figure 3:
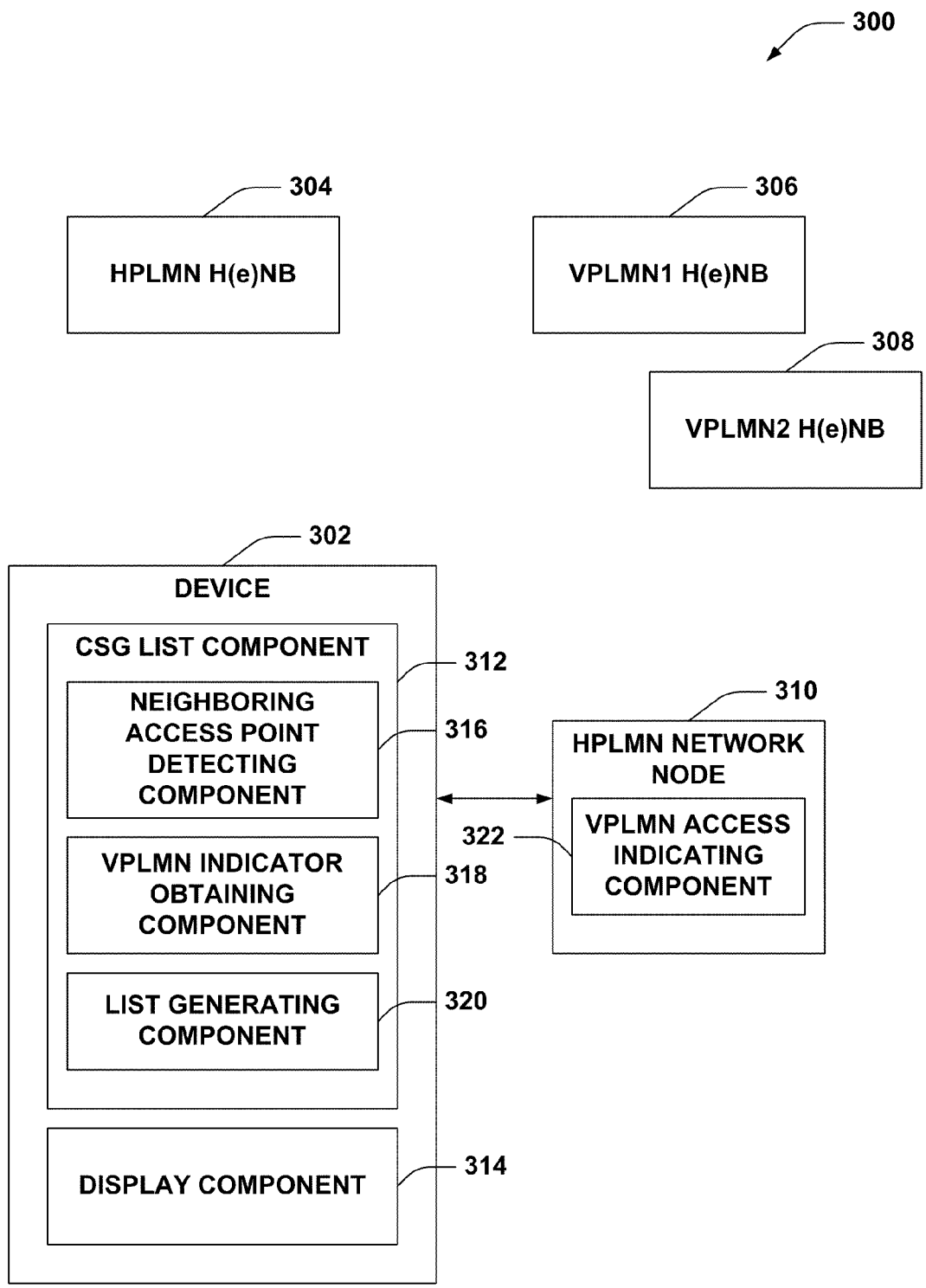
FIG. 3 illustrates an example system that displays CSGs in a list for manual selection.

Referring to FIG. 3, illustrated is an example wireless communication system 300 that facilitates generating a list of neighboring cells. System 300 can comprise a device 302 that communicates in a wireless network. In addition, system 300 can comprise one or more H(e)NBs, such as HPLMN H(e)NB 304, which is an H(e)NB of a HPLMN of device 302, VPLMN1 H(e)NB 306, which is an H(e)NB of VPLMN1, and VPLMN2 H(e)NB 308, which is an H(e)NB of VPLMN2. VPLMN1 and VPLMN2 can be different VPLMNs (e.g., operated by different network operators from a network operator for device 302). System 300 further comprises an HPLMN network node 310, which can be substantially any core network node of an HPLMN, such as a MME, SGSN, MSC/VLR, HSS/HLR, and/or the like that provisions one or more parameters to the device 302. Though shown as directly coupled to HPLMN network node 310, it is to be appreciated that device 302 can communicate with HPLMN network node 310 through one or more other HPLMN network components, such as one or more access points (which can include HPLMN H(e)NB 304, in one example), gateways, routers, etc.

Device 302 can comprise a CSG list component 312 that generates a list of CSGs available for manual selection, and a display component 314 that can render the list on a display of device 302. CSG list component 312 can comprise a neighboring access point detecting component 316 for determining one or more access points or related cells with which or within which device 302 can communicate, a VPLMN indicator obtaining component 318 for receiving one or more indicators that specify whether device 302 can utilize CSG cells in one or more VPLMNs, and a list generating component 320 that compiles a list of neighboring CSGs (e.g., and/or access points or cells of the CSGs) available for communication based at least in part on the one or more indicators. HPLMN network node 310 can comprise a VPLMN access indicating component 322 that provisions one or more indicators to device 302 that specify whether device 302 can utilize CSG cells in one or more VPLMNs.

According to an example, neighboring access point detecting component 316 can determine one or more access points with which device 302 can communicate. For example, this can be based at least in part on detecting signals from the one or more access points that have a threshold signal-to-noise ratio (SNR) or other quality measurement. For example, neighboring access point detecting component 316 can initiate the detection of neighboring access points based at least in part on a request received from a user interface for a list of neighboring access points, a timer or event related to reselection, and/or the like. In addition, VPLMN access indicating component 322 can provide one or more indicators to device 302 that specify whether device 302 can access CSG cells in one or more VPLMNs, and VPLMN indicator obtaining component 318 can receive the indicators.

In one example, VPLMN indicator obtaining component 318 can request the indicators (e.g., based at least in part on a neighboring access point detecting component 316 initiating a search for neighboring access points, as part of establishing a connection with the HPLMN, based at least in part on a timer or other event, etc.). For example, an indicator received from VPLMN access indicating component 322 can relate to whether device 302 is allowed to access CSGs in any VPLMN (e.g., CSGs for which membership or access is not provisioned by the HPLMN). In an additional or alternative example, an indicator received from VPLMN access indicating component 322 can relate to whether device 302 is allowed to access CSGs in specific VPLMNs. For example, this can be a collection of flags each related to a VPLMN, an operator controlled list of VPLMNs within which device 302 can (or cannot) access CSGs, and/or the like. In addition, the VPLMNs can be indicated by a PLMN identifier thereof, such that the device 302 can determine the VPLMN from broadcast information from the H(e)NBs and determine whether to accordingly include the H(e)NBs in a CSG list.

Thus, for example, VPLMN indicator obtaining component 318 can receive the one or more indicators, and list generating component 320 can exclude CSGs (e.g., and/or related access points or cells) from a CSG list to which device 302 is not allowed access and/or include CSGs for the CSG list related to CSGs for which device 302 is allowed access. In a specific example, neighboring access point detecting component 316 can detect presence of HPLMN H(e)NB 304, VPLMN1 H(e)NB 306, and VPLMN2 H(e)NB 308. For example, VPLMN indicator obtaining component 318 can receive an indication that device 302 is generally allowed to access CSGs in VPLMNs. Thus, list generating component 320 can create a CSG list that includes HPLMN H(e)NB 304, VPLMN1 H(e)NB 306, and VPLMN2 H(e)NB 308 (e.g., and/or related CSG and/or cell identifiers). In another example, VPLMN indicator obtaining component 318 can also receive an indicator that device 302 is not allowed to access CSGs in VPLMN1. In this example, list generating component 320 can create a CSG list that includes HPLMN H(e)NB 304 and VPLMN2 H(e)NB 308 (e.g., and/or related CSG and/or cell identifiers). In either case, display component 314 can display the CSG list in a manual selection or similar list. It is to be appreciated that device 302 can utilize the CSG list in other examples, such as to perform reselection to one or more CSG access points on the HPLMN or VPLMN, etc.

In addition, it is to be appreciated, as described, that CSG list component 312 can maintain an operator CSG list received from an MME or similar node (e.g., of the HPLMN or one or more VPLMNs) and/or a allowed list of CSGs. Thus, in one example, list generating component 320 can determine whether to display H(e)NBs in the CSG list additionally based at least in part on whether the CSGs are present in the operator CSG and/or allowed CSG lists. In one example, where the CSGs are in one of the operator CSG and/or allowed CSG lists, list generating component 320 can include the CSGs in the manual selection CSG list regardless of other parameters. Thus, for example, list generating component 320 can evaluate the one or more indicators for CSG cells detected by neighboring access point detecting component 316 that are not in the operator CSG or allowed CSG lists.

Figure 4:
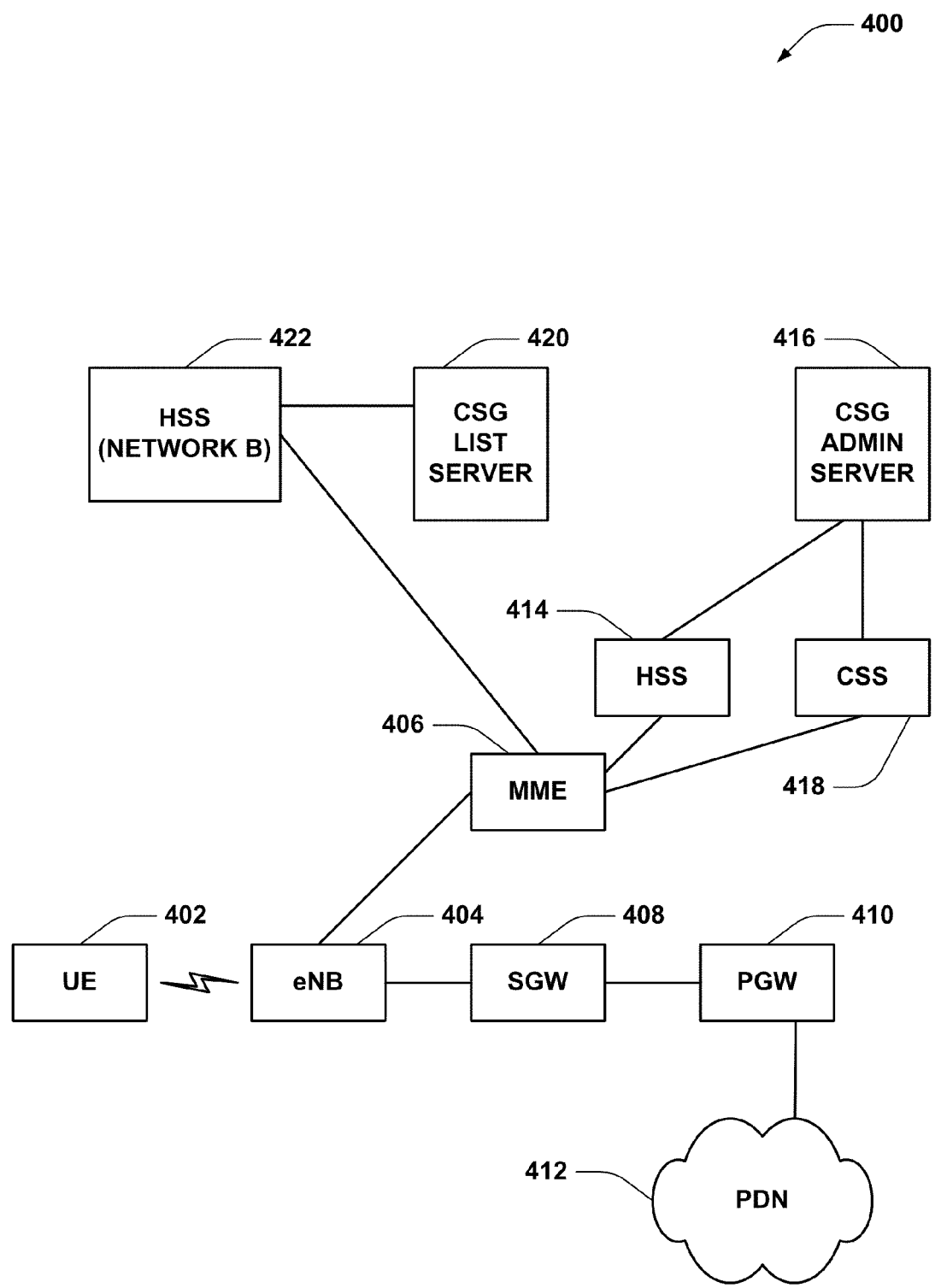
FIG. 4 illustrates an example wireless communication network in accordance with aspects described herein.

Turning to FIG. 4, an example wireless communication network 400 is depicted that comprises entities such as UE 402 and one or more components of a VPLMN, such as an eNB 404 (e.g., H(e)NB), a MME 406, a serving gateway (SGW) 408, a packet data network (PDN) gateway (PGW) 410, a PDN 412, a HSS 414, a CSG administration server 416, a CSS 418. Network 400 can also comprise a CSG list server 420 and an HSS 422 of an HPLMN of UE 402. Though shown an generally described in relation to a 3GPP LTE network, it is to be appreciated, however, that the concepts described herein may be applicable to other implementations (e.g., a UMTS-based system, etc.), which can include additional or alternative nodes.

According to an example, UE 402 can attempt access to eNB 404 of the VPLMN (e.g., by sending an attach request, registration request, TAU, LAU, RAU, or similar message thereto). eNB 404 can forward one or more messages related to the access attempt to MME 406. MME 406 can determine the UE 402 is a member of another network, and can query HSS 422 for device subscription information related to UE 402. As described, HSS 422 can provide the device subscription information to MME 406 along with a CSG roaming indicator. In addition, in an example, HSS 422 can provide CSG subscription information related to device 402 to MME 406. For example, HSS 422 can obtain the CSG subscription information from CSG list server 420. MME 406 can obtain the CSG roaming indicator, and can query CSS 418 for additional CSG subscription information for UE 402 related to the VPLMN where the CSG roaming indicator specifies that UE 402 is allowed to utilize autonomous CSG roaming in the visited network. In this example, CSS 418 can obtain CSG subscription information of CSGs accessible by UE 402 in the VPLMN (e.g., one or more lists, as described, from CSG administration server 416), and can provide the information to MME 406. In addition, in an example, CSS 418 can allow for provisioning of UE 402 to one or more CSGs in the VPLMN via CSG administration server 416.

Once MME 406 obtains the CSG roaming indicator and/or operator CSG list, MME 406 can determine whether UE 402 can access eNB 404. For example, where the CSG roaming indicator specifies that UE 402 is not allowed to utilize autonomous CSG roaming in the VPLMN, MME 406 can refrain from requesting CSG subscription information from CSS 418 and can deny UE 402 access to eNB 404. In another example, where the CSG roaming indicator specifies that UE 402 is allowed to utilize autonomous CSG roaming in the VPLMN, but the requested CSG subscription information does not include a CSG related to eNB 404, MME 406 can deny UE 402 access to eNB 404. Where the CSG is in the CSG subscription information, for example, MME 406 can grant UE 402 access to eNB 404. It is to be appreciated, for example, that MME 406 can grant UE 402 a certain level of access to eNB 404, which can be based on information in the CSG subscription information or other parameters.

In addition, as described, UE 402 can obtain one or more indicators regarding access CSGs in VPLMNs from a configuration, hardcoding, one or more nodes of the HPLMN, etc. The one or more indicators can specify whether UE 402 is allowed access to CSGs in any VPLMNs, CSGs in certain VPLMNs, etc., as described. UE 402 can accordingly first determine whether access is allowed for CSGs generally and/or for CSGs in the VPLMN before attempting access to eNB 404 using the one or more indicators. In another example, UE 402 can determine CSGs to display in a manual selection list based at least in part on the one or more indicators, as described.

Figure 5:
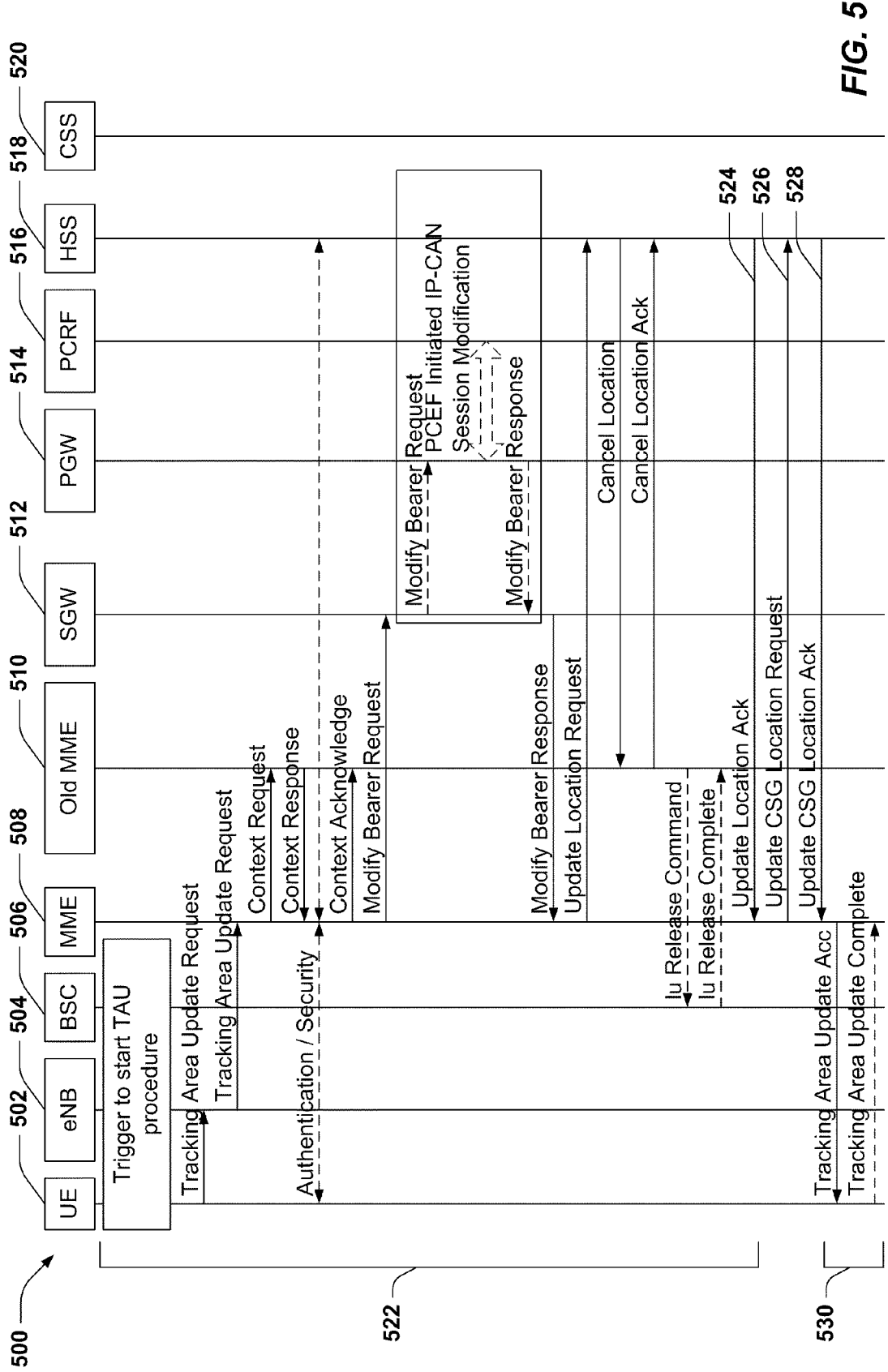
FIG. 5 is a message flow diagram of an aspect of performing a tracking area update procedure.

Referring to FIG. 5, an example wireless communication system 500 is illustrated that performs a TAU procedure including determining to request CSG subscription information for a UE on a visited network. System 500 can include a UE 502, eNB 504 (e.g., H(e)NB), base station controller (BSC) (and/or radio network controller (RNC)) 506, MME 508, old MME 510 (either of which can be an SGSN and/or the like), SGW 512, PGW 514, policy charging and rules function (PCRF) 516, HSS 518, and CSS 518. It is to be appreciated that HSS 518 can be in a HPLMN of UE 502, while the remaining nodes are part of a VPLMN, for example. Messages 522 are shown relating to performing a TAU procedure in an LTE, or similar E-UTRA network, including a trigger to start the TAU procedure at UE 502, a TAU request between UE 502 and eNB 504, the TAU request forwarded from eNB 502 to MME 508, a context request and response, optional authentication and/or security for UE 502 between MME 508 and HSS 518, a context acknowledge, a modify bearer request to SGW 512, a corresponding modify bearer request from SGW 512 to PGW 514, a policy and charging enforcement function (PCEF) initiated internet protocol connectivity access network (IP-CAN) session modification, corresponding modify bearer responses, an Update Location Request from MME 508 to HSS 518, as described above, a cancel location and corresponding acknowledgement between the old MME 510 and HSS 516, and an Iu release command and Iu release complete for the BSC 504.

HSS 518 can transmit an Update Location Acknowledgement 524 to MME 508, which can include subscription information related to UE 502. Additionally, as described, the Update Location Acknowledgement can also include a CSG roaming indicator to specify whether UE 502 is allowed to utilize autonomous CSG roaming in the VPLMN of MME 508. In this example, the CSG roaming indicator can specify that UE 502 is allowed to utilize autonomous CSG roaming in the VPLMN, and thus MME 508 can transmit an Update CSG Location Request 526 to CSS 520 to obtain CSG subscription information therefrom, such as one or more operator CSG or allowed CSG lists related to UE 502. CSS 520 can return an Update CSG Location Acknowledgement 528 to MME 508 including one or more such lists or other information regarding CSGs with which UE 502 can communicate in the VPLMN. Additional TAU procedure messages 530 are shown including a TAU accept from MME 508 and an optional TAU complete from UE 502.

Figure 6:
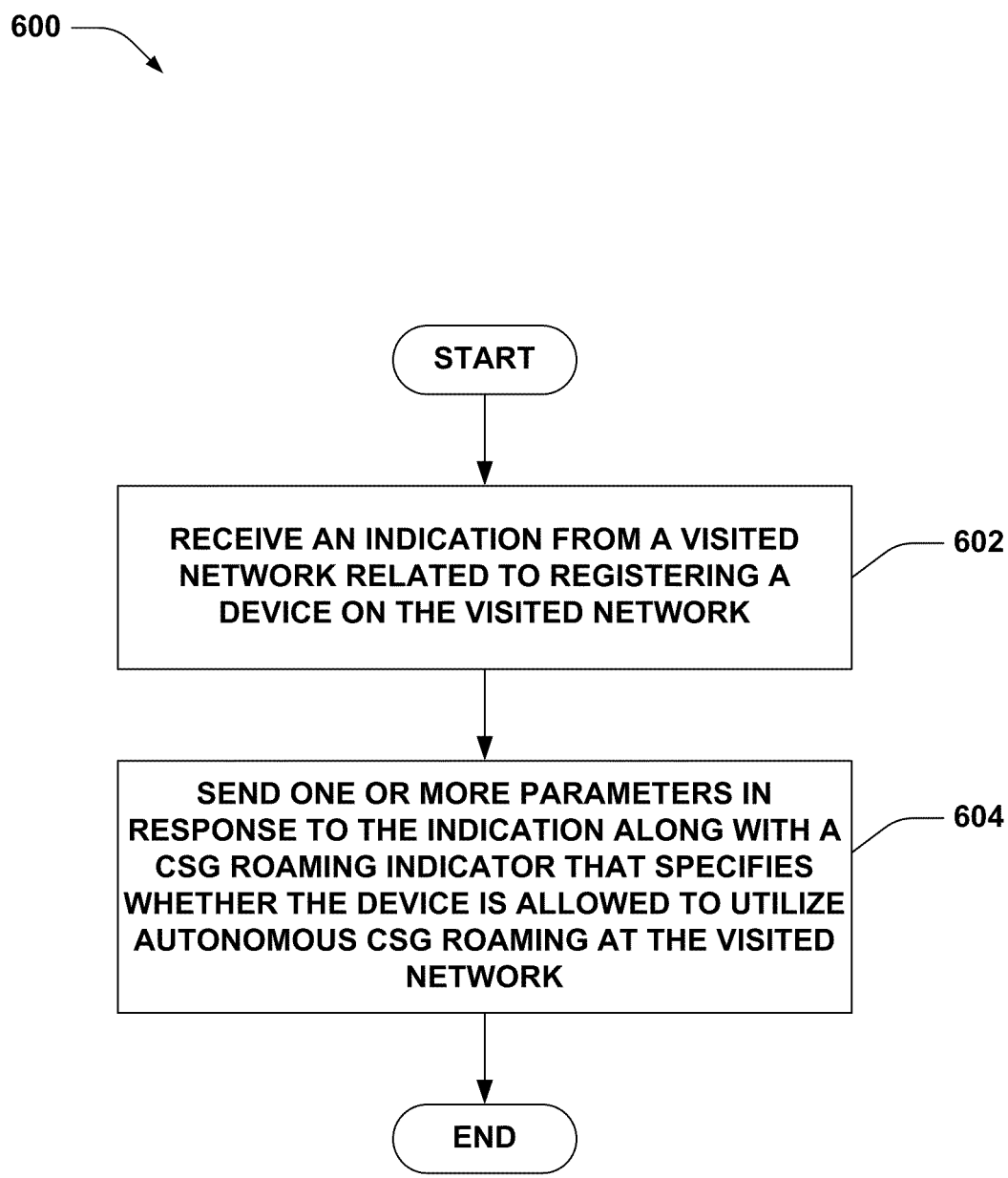
FIG. 6 is a flow chart of an aspect of a methodology for indicating whether a device is allowed to access CSGs in a visited network.
Figure 7:
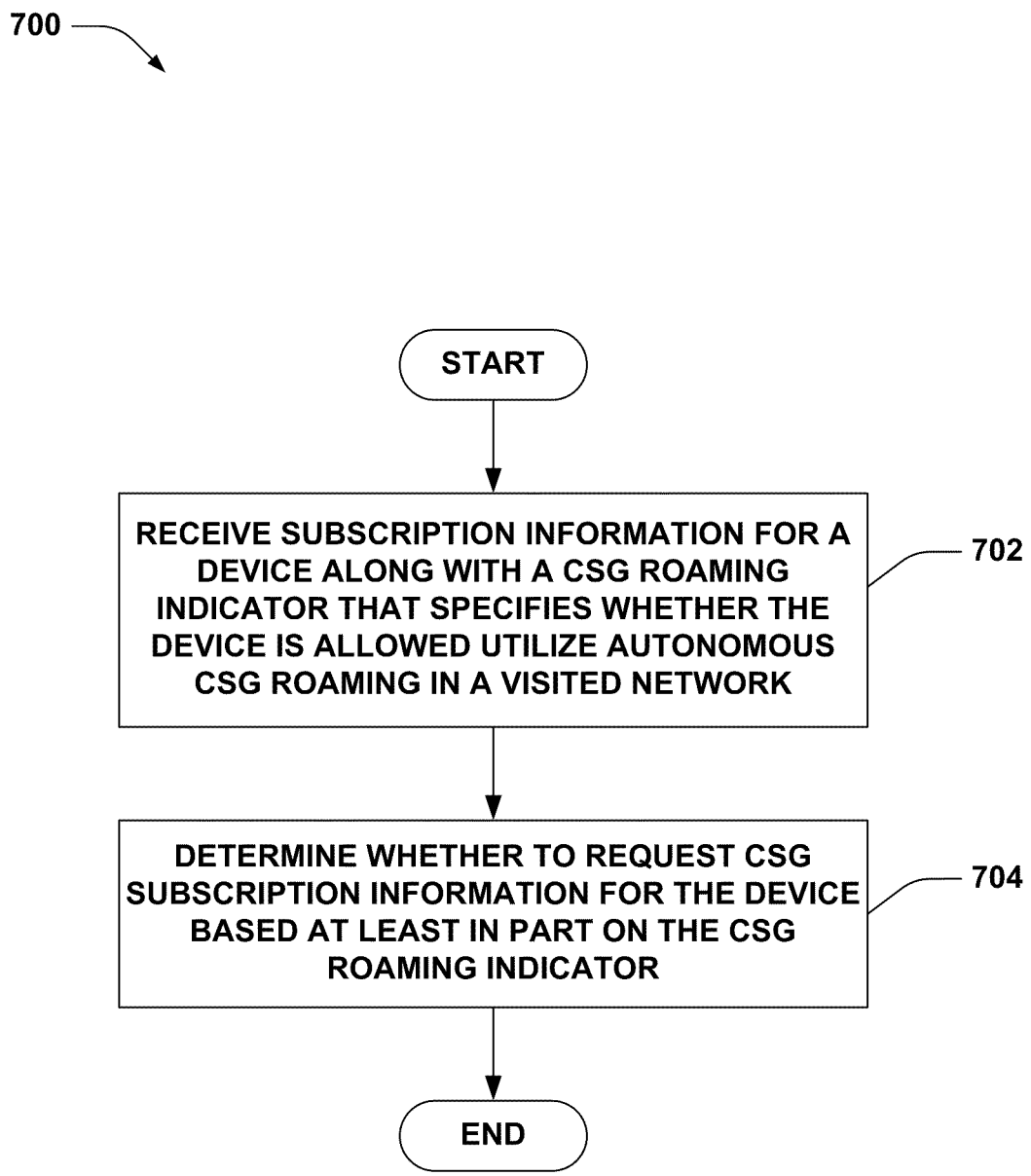
FIG. 7 is a flow chart of an aspect of a methodology that determines whether to request CSG subscription information for a device.
Figure 8:
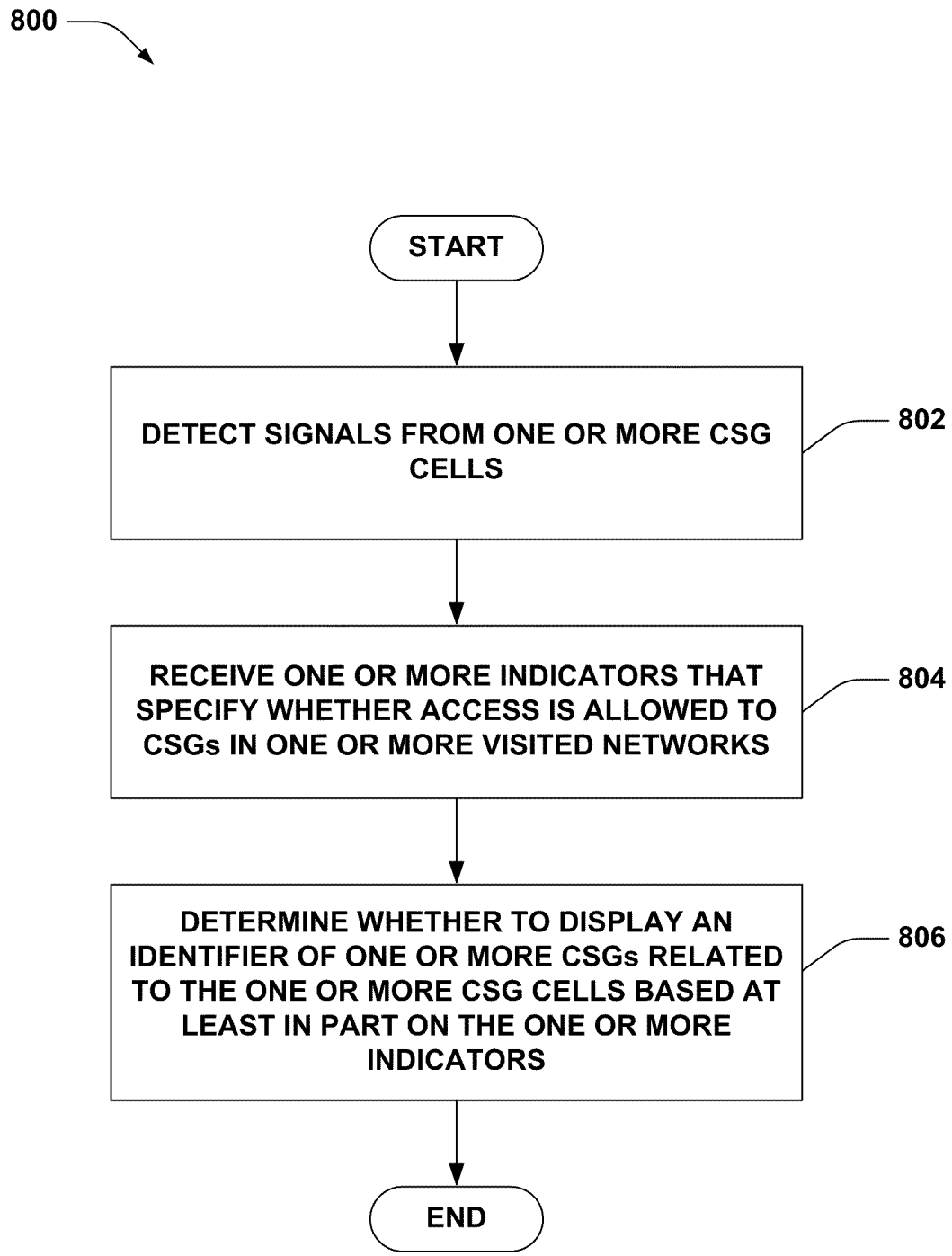
FIG. 8 is a flow chart of an aspect of a methodology for displaying a list of accessible CSGs.

Referring to FIGS. 6-8, example methodologies relating to controlling CSG access for a device in a visited network are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Referring to FIG. 6, an example methodology 600 is displayed that facilitates indicating whether a device is allowed to access CSGs in a visited network. At 602, an indication related to registering a device on a visited network can be received from the visited network. For example, the device can be requesting access to an H(e)NB on the visited network. The indication can be part of an Update Location Request transmitted by an MME or similar node in the visited network. At 604, one or more parameters can be sent in response to the indication along with a CSG roaming indicator that specifies whether the device is allowed to utilize autonomous CSG roaming at the visited network. For example, the one or more parameters can relate to subscription information for the device or a related user. The CSG roaming indication, in an example, can be initialized by a network operator based on operator policy, a roaming agreement, a subscription class, a billing model, etc., as described. Moreover, the CSG roaming indicator can be specific to the visited network or can apply generally to visited networks. In addition, for example, the parameters and/or CSG roaming indicator can be sent in an Update Location Request Acknowledgement, as described.

Turning to FIG. 7, an example methodology 700 is displayed that facilitates determining whether to request CSG subscription information for a device based on a CSG roaming indicator. At 702, subscription information for a device can be received along with a CSG roaming indicator that specifies whether the device is allowed to utilize autonomous CSG roaming in a visited network. As described, the subscription information and/or CSG roaming indicator can be received in an Update Location Request Acknowledgement message received in response to an Update Location Request sent to register the device on the visited network. In addition, for example, this can be part of an attach request, registration request, TAU, LAU, RAU, etc. initiated by the device. At 704, it can be determined whether to request CSG subscription information for the device based at least in part on the CSG roaming indicator. Thus, for example, where the CSG roaming indicator specifies the device is allowed to utilize autonomous CSG roaming in the visited network, CSG subscription information can be requested for the device (e.g., from a CSS, HSS, etc.).

Referring to FIG. 8, illustrated is an example methodology 800 for displaying a list of CSGs. At 802, signals from one or more CSG cells can be detected. As described, the CSG cells can be provided by one or more CSG access points that transmit the signals. At 804, one or more indicators can be received that specify whether access is allowed to CSGs in one or more visited networks. As described, the one or more indicators can relate to whether access is allowed to CSGs in visited networks in general, whether access is allowed to CSGs in specific visited networks, and/or the like. At 806, it can be determined whether to display an identifier of one or more CSGs related to the one or more CSG cells based at least in part on the one or more indicators. For example, where the one or more indicators specify that access is not allowed to CSGs in visited networks generally, CSGs (e.g., which are not in an allowed list) that are detected at 802 are not displayed in the list. Where the indicator specifies that access to CSGs is allowed in visited networks and there is not indicator specifying that access to CSGs is not allowed in the visited network related to the one or more CSGs, the identifier of the CSG can be displayed in the list. For example, the list can be for manual selection. In addition, in an example, identifiers of the cells, related access points, or other identifiers (instead of or in addition to the CSG identifiers) can be displayed based on the indicators.

It will be appreciated that, in accordance with one or more aspects described herein, inferences can be made regarding initializing a CSG roaming indicator, determining whether to allow access to or display CSGs in a list based on one or more indicators, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
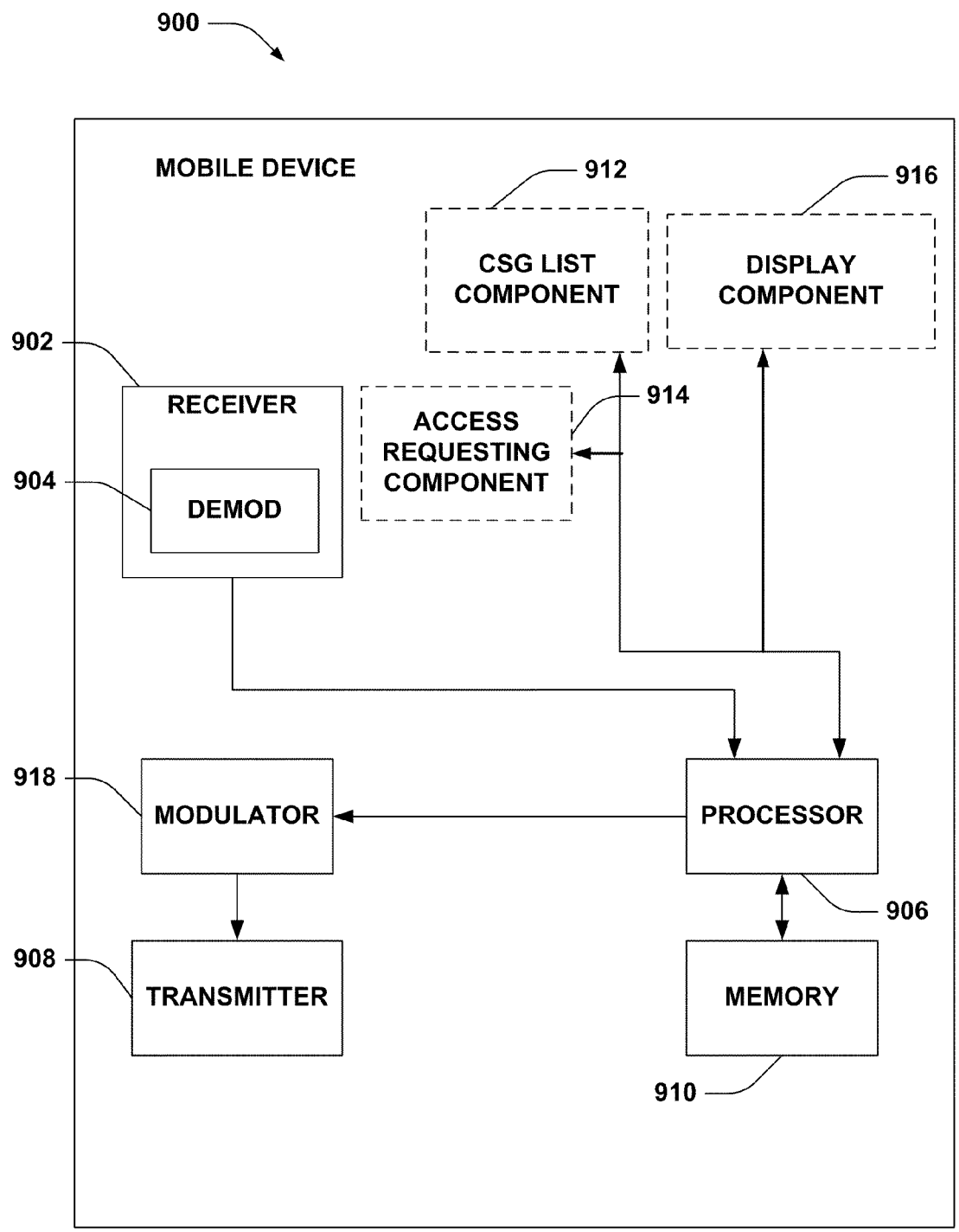
FIG. 9 illustrates an example mobile device in accordance with various aspects described.

FIG. 9 is an illustration of a mobile device 900 that facilitates managing one or more lists of CSGs. Mobile device 900 comprises a receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can comprise a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900.

Mobile device 900 can additionally comprise memory 910 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 910 can additionally store protocols and/or algorithms associated with estimating and/or utilizing a channel (e.g., performance based, capacity based, etc.).

It will be appreciated that the data store (e.g., memory 910) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to comprise, without being limited to, these and any other suitable types of memory.

Processor 906 can further be optionally operatively coupled to a CSG list component 912, which can be similar to a CSG list component 116 including one or more lists described with reference thereto, a CSG list component 214, or a CSG list component 312 including one or more related components described. In addition, processor 906 can further be optionally operatively coupled to an access requesting component 914, which can be similar to access requesting component 212, and/or a display component 916, which can be similar to display component 314. Mobile device 900 still further comprises a modulator 918 that modulates signals for transmission by transmitter 908 to, for instance, a base station, another mobile device, etc. Although depicted as being separate from the processor 906, it is to be appreciated that the CSG list component 912, access requesting component 914, display component 916, demodulator 904, and/or modulator 918 can be part of the processor 906 or multiple processors (not shown). In another example, CSG list component 912, access requesting component 914, and/or display component 916 can be components stored in memory 910 and/or executed (by processor 906) according to instructions stored in memory 910.

Figure 10:
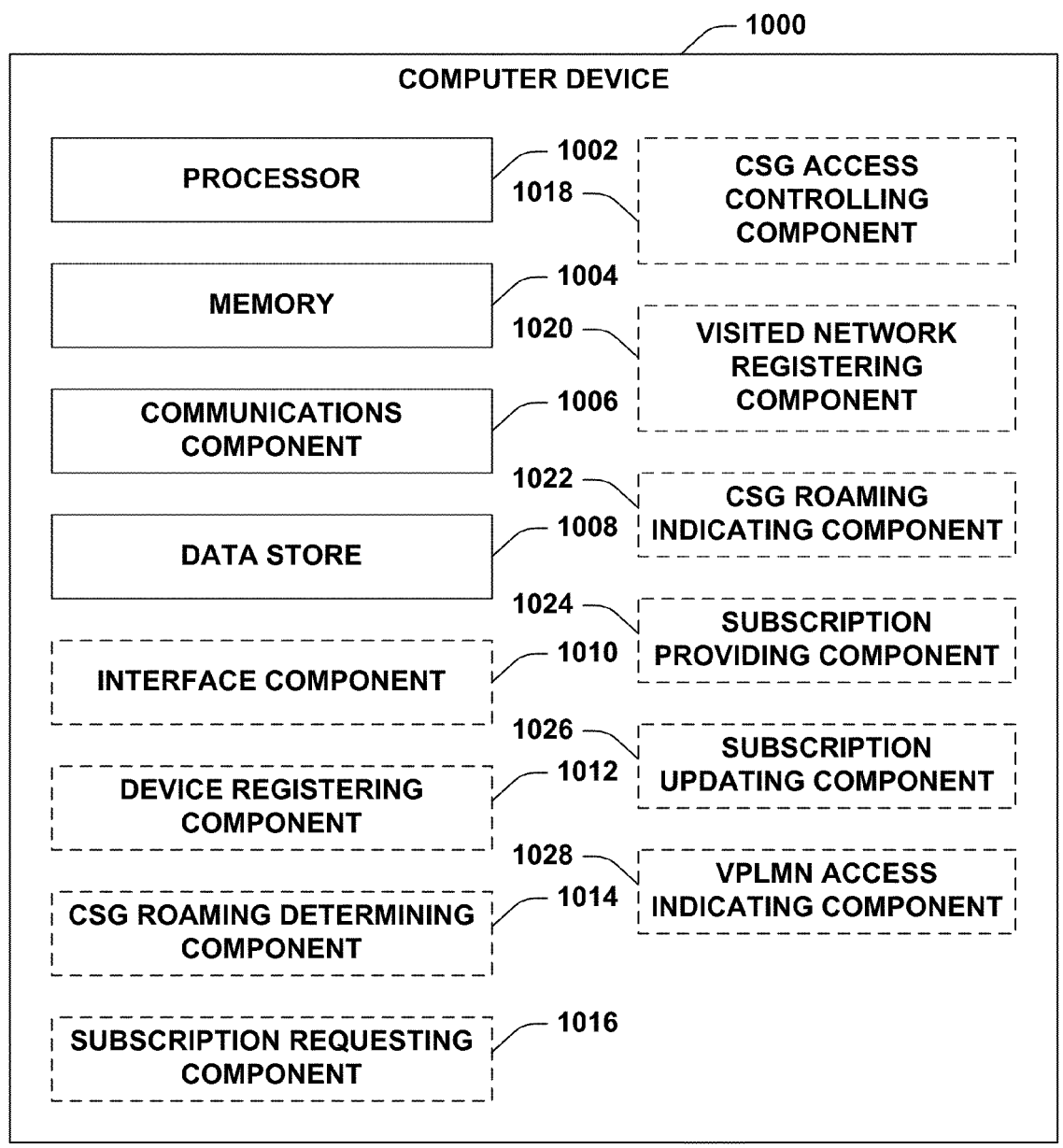
FIG. 10 illustrates an example computing device according to various aspects described herein.

Referring to FIG. 10, in one aspect, any of network nodes 106 or 108, mobility manager 206, HSS/HLRs 208, 414, 422, or 518, CSSs 210, 418, or 520, HPLMN network node 310, MMEs 406, 508, or 510, SGWs 408 or 512, PGWs 410 or 514, nodes of PDN 412, CSG administration server 416, CSG list server 420, etc. (e.g., FIGS. 1-5) can be represented by computer device 1000. Computer device 1000 includes a processor 1002 for carrying out processing functions associated with one or more of components and functions described herein. Processor 1002 can include a single or multiple set of processors or multi-core processors. Moreover, processor 1002 can be implemented as an integrated processing system and/or a distributed processing system.

Computer device 1000 further includes a memory 1004, such as for storing local versions of applications being executed by processor 1002. Memory 1004 can include substantially any type of memory usable by a computer, such as random access memory (RAM), read only memory (ROM), tapes, magnetic discs, optical discs, volatile memory, non-volatile memory, and any combination thereof. Computer device 1000 also includes one or more components 1006-1028, which can be stored in memory 1004, executed by processor 1002 (e.g., based on instructions stored in memory 1004), be implemented within one or more processors 1002, and/or the like.

Further, computer device 1000 includes a communications component 1006 that provides for establishing and maintaining communications with one or more parties utilizing hardware, software, and services as described herein. Communications component 1006 may carry communications between components on computer device 1000, as well as between computer device 1000 and external devices, such as devices located across a communications network and/or devices serially or locally connected to computer device 1000. For example, communications component 1006 may include one or more buses, and may further include transmit chain components and receive chain components associated with a transmitter and receiver, respectively, operable for interfacing with external devices.

Additionally, computer device 1000 may further include a data store 1008, which can be any suitable combination of hardware and/or software, that provides for mass storage of information, databases, and programs employed in connection with aspects described herein. For example, data store 1008 may be a data repository for applications not currently being executed by processor 1002.

Computer device 1000 may optionally include an interface component 1010 operable to receive inputs from a user of computer device 1000, and further operable to generate outputs for presentation to the user. Interface component 1010 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 1010 may include one or more output devices, including but not limited to a display, a speaker, a haptic feedback mechanism, a printer, any other mechanism capable of presenting an output to a user, or any combination thereof. In another example, interface component 1010 can be an application programming interface (API) that can be accessed by one or more devices to perform functions on computer device 1000.

In addition, in the depicted example, computer device 1000 can optionally include one or more of device registering component 1012, which can be similar to device registering component 216, a CSG roaming determining component 1014, which can be similar to CSG roaming determining component 218, a subscription requesting component 1016, which can be similar to subscription requesting component 220, a CSG access controlling component 1018, which can be similar to CSG access controlling component 222, a visited network registering component 1020, which can be similar to visited network registering component 224, a CSG roaming indicating component 1022, which can be similar to CSG roaming indicating component 226, a subscription providing component 1024, which can be similar to subscription providing component 228, a subscription updating component 1026, which can be similar to subscription updating component 230, and/or a VPLMN access indicating component 1028, which can be similar to VPLMN access indicating component 322. Thus, these components 1012, 1014, 1016, 1018, 1020, 1022, 1024, 1026, and/or 1028 can utilize processor 1002 to execute instructions associated therewith, memory 1004 to store information associated therewith, communications component 1006 to carry out communications, and/or the like, as described. In addition, it is to be appreciated that computer device 1000 can include additional or alternative components described herein.

Figure 11:
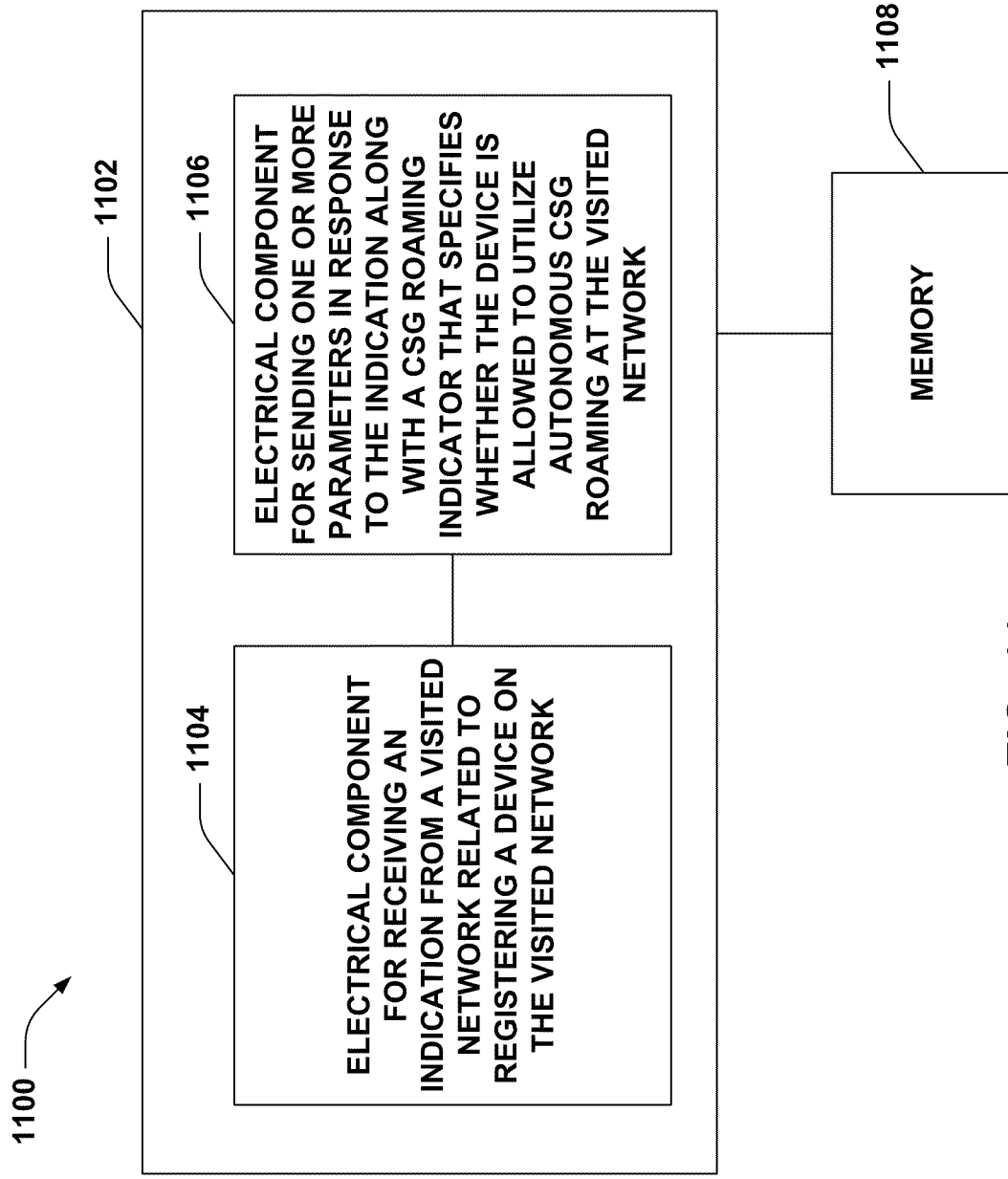
FIG. 11 illustrates an example system for indicating whether a device is allowed to access CSGs in a visited network.

With reference to FIG. 11, illustrated is a system 1100 that specifies whether a device is allowed to access CSGs in a visited network. For example, system 1100 can reside at least partially within an HSS/HLR, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving an indication from a visited network related to registering a device on the visited network 1104. As described, this can include receiving an Update Location Request from an MME in the visited network.

Further, logical grouping 1102 can comprise an electrical component for sending one or more parameters in response to the indication along with a CSG roaming indicator that specifies whether the device is allowed to utilize autonomous CSG roaming at the visited network 1106. For example, the CSG roaming indicator can be initialized by a network operator, as described, and can be specific to one or more visited networks and/or generic to any visited network. For example, the CSG roaming indicator can allow for determining whether to request CSG subscription information for the device, as described. For example, electrical component 1104 can include a visited network registering component 224, as described above. In addition, for example, electrical component 1106, in an aspect, can include a CSG roaming indicating component 226, as described above. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108.

In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
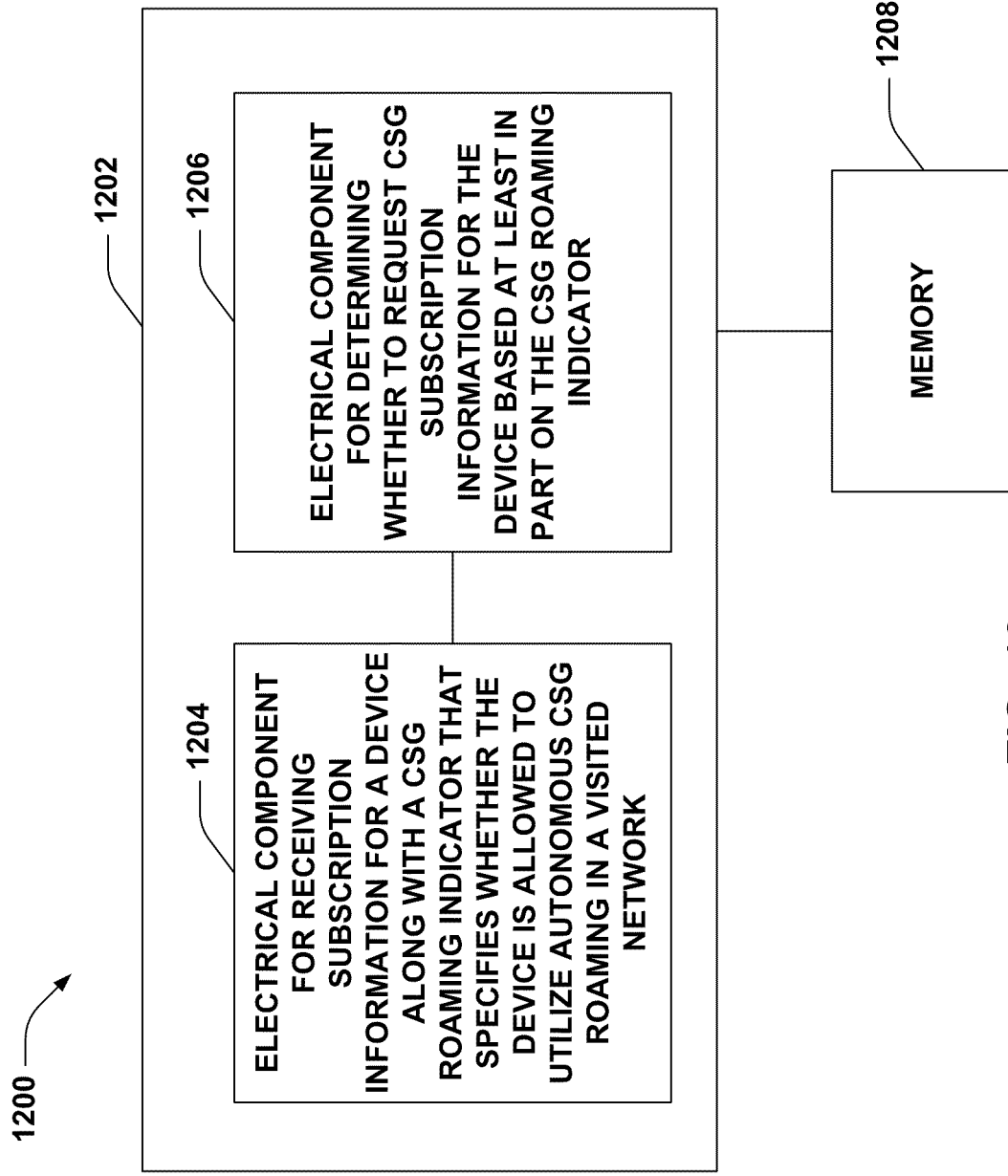
FIG. 12 illustrates an example system for determining whether to request CSG subscription information for a device.

With reference to FIG. 12, illustrated is a system 1200 that determines whether to request CSG subscription information for a device. For example, system 1200 can reside at least partially within a MME, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving subscription information for a device along with a CSG roaming indicator that specifies whether the device is allowed to utilize autonomous CSG roaming in a visited network 1204. As described, this can include receiving CSG roaming indicator and/or subscription information for the device in an Update Location Request Acknowledgement or similar message.

Further, logical grouping 1202 can comprise an electrical component for determining whether to request CSG subscription information for the device based at least in part on the CSG roaming indicator 1206. As described, for example, where the CSG roaming indicator specifies that the device can access CSGs in the visited network, CSG subscription information for the device can be requested from a CSS or similar node. For example, electrical component 1204 can include a device registering component 216, as described above. In addition, for example, electrical component 1206, in an aspect, can include a CSG roaming determining component 218, as described above. Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208.

In one example, electrical components 1204 and 1206 can comprise at least one processor, or each electrical component 1204 and 1206 can be a corresponding module of at least one processor. Moreover, in an additional or alternative example, electrical components 1204 and 1206 can be a computer program product comprising a computer readable medium, where each electrical component 1204 and 1206 can be corresponding code.

Figure 13:
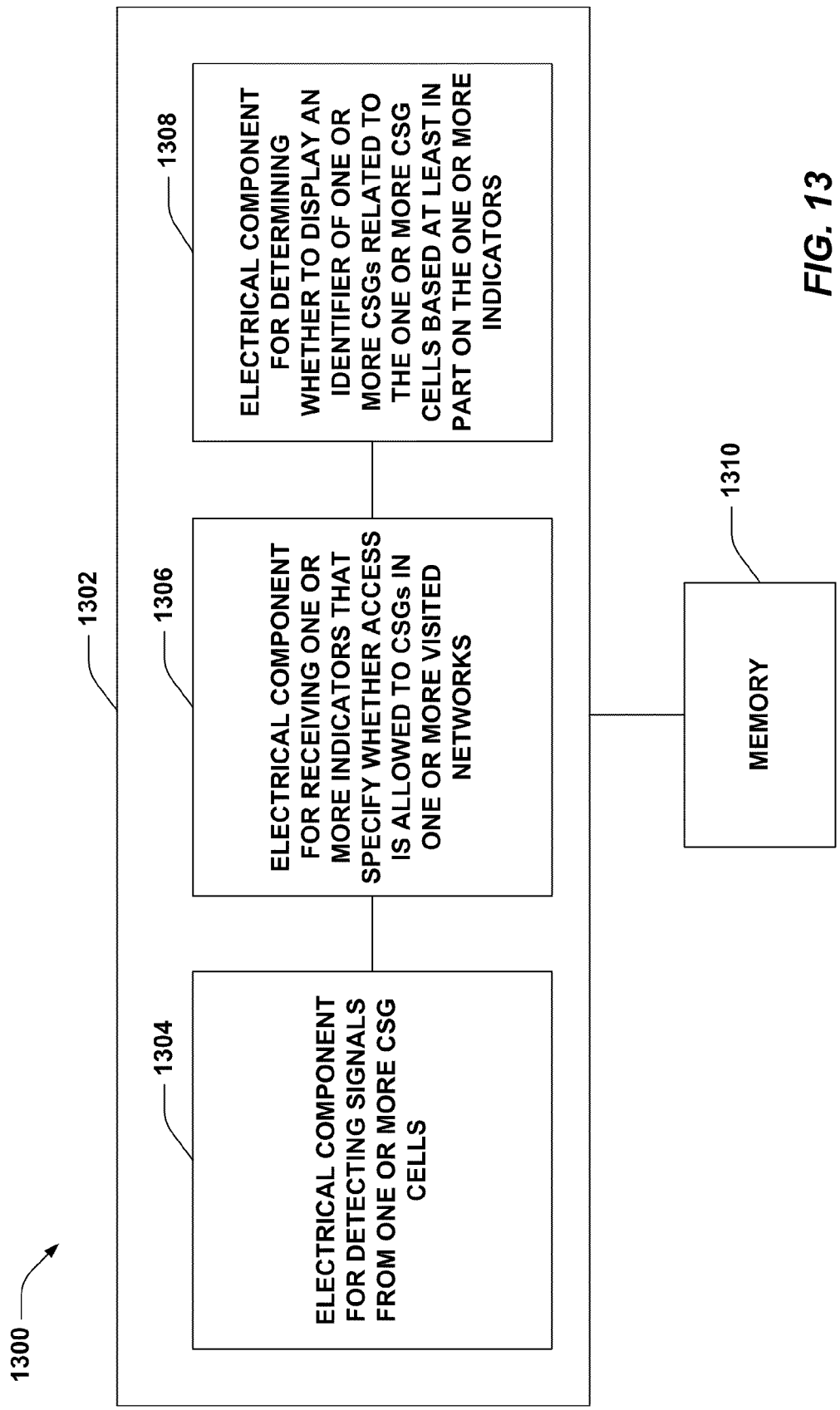
FIG. 13 illustrates an example system for displaying a list of accessible CSGs.

With reference to FIG. 13, illustrated is a system 1300 that displays a list of available CSGs. For example, system 1300 can reside at least partially within a mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for detecting signals from one or more CSG cells 1304. Further, logical grouping 1302 can comprise an electrical component for receiving one or more indicators that specify whether access is allowed to CSGs in one or more visited networks 1306. For example, the one or more indicators can relate to whether CSGs are accessible in visited networks generally, in one or more specific visited networks, and/or the like. In addition, the one or more indicators can be received by electrical component 1306 from a hardcoding, configuration, one or more nodes of a home network, etc.

Logical grouping 1302 can additionally comprise an electrical component for determining whether to display an identifier of one or more CSGs related to the one or more CSG cells based at least in part on the one or more indicators 1308. As described, for example, this can include determining whether access is allowed for CSGs in wireless networks in general as well as determining whether access is allowed for CSGs in the specific visited network related to the one or more CSG cells. For example, in an aspect, electrical component 1304 can include a neighboring access point detecting component 316, as described above. In addition, for example, electrical component 1306, in an aspect, can include VPLMN indicator obtaining component 318, as described above. Moreover, electrical component 1308 can include a list generating component 320. Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310.

In one example, electrical components 1304, 1306, and 1308 can comprise at least one processor, or each electrical component 1304, 1306, and 1308 can be a corresponding module of at least one processor. Moreover, in an additional or alternative example, electrical components 1304, 1306, and 1308 can be a computer program product comprising a computer readable medium, where each electrical component 1304, 1306, and 1308 can be corresponding code.

Figure 14:
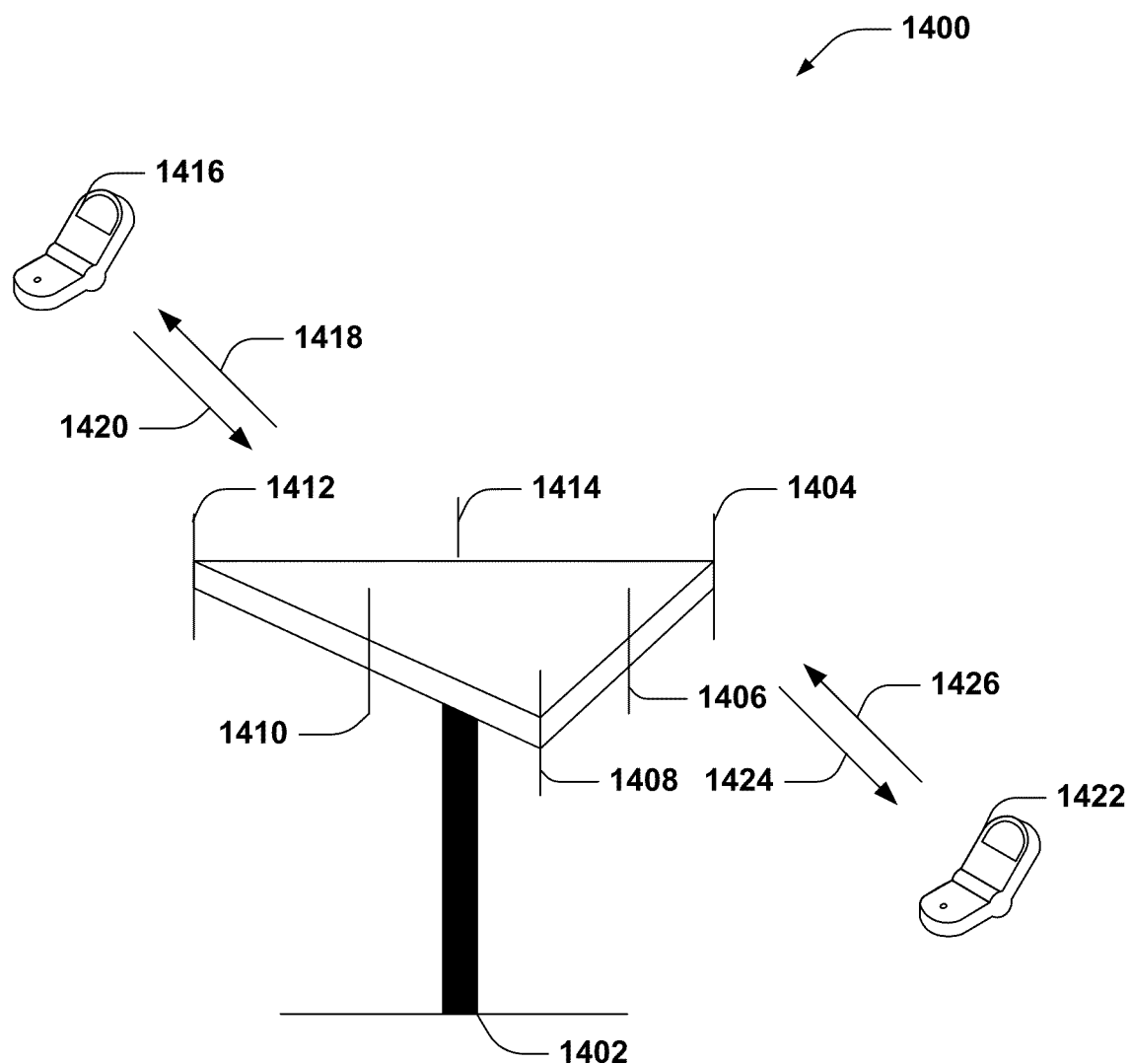
FIG. 14 illustrates an example wireless communication system in accordance with various aspects set forth herein.

Referring now to FIG. 14, a wireless communication system 1400 is illustrated in accordance with various aspects presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology as depicted. According to an example, system 1400 can be a multiple-input multiple-output (MIMO) communication system.

Figure 15:
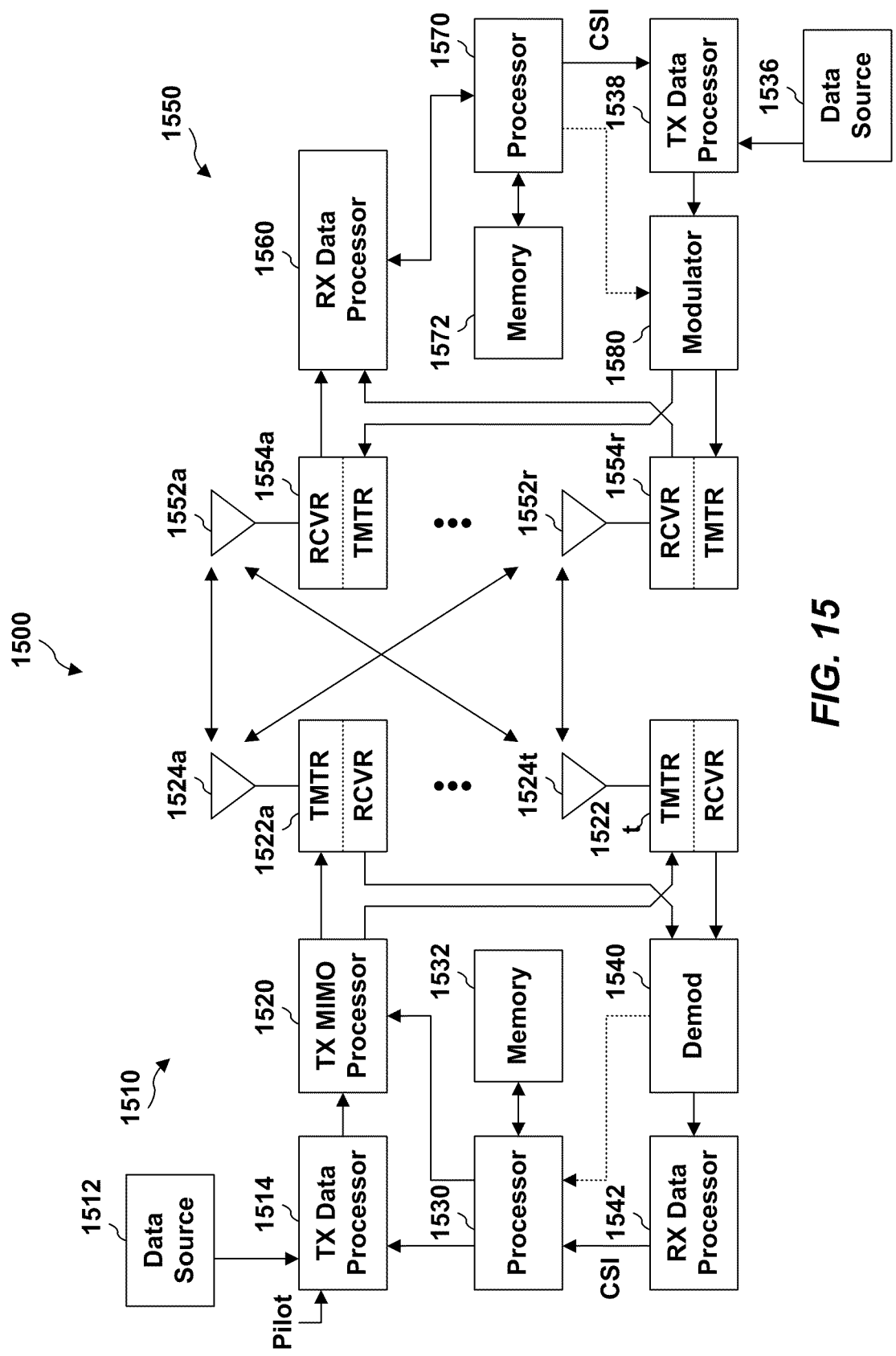
FIG. 15 illustrates an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-5 and 11-14), mobile devices (FIG. 9), computer devices, (FIG. 10), and/or methods (FIGS. 6-8) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides NT modulation symbol streams to NT transmitters (TMTR) 1522a through 1522t. In various aspects, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1522a through 1522t are transmitted from NT antennas 1524a through 1524t, respectively.

At mobile device 1550, the transmitted modulated signals are received by NR antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the NR received symbol streams from NR receivers 1554 based on a particular receiver processing technique to provide NT "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

Figure 16:
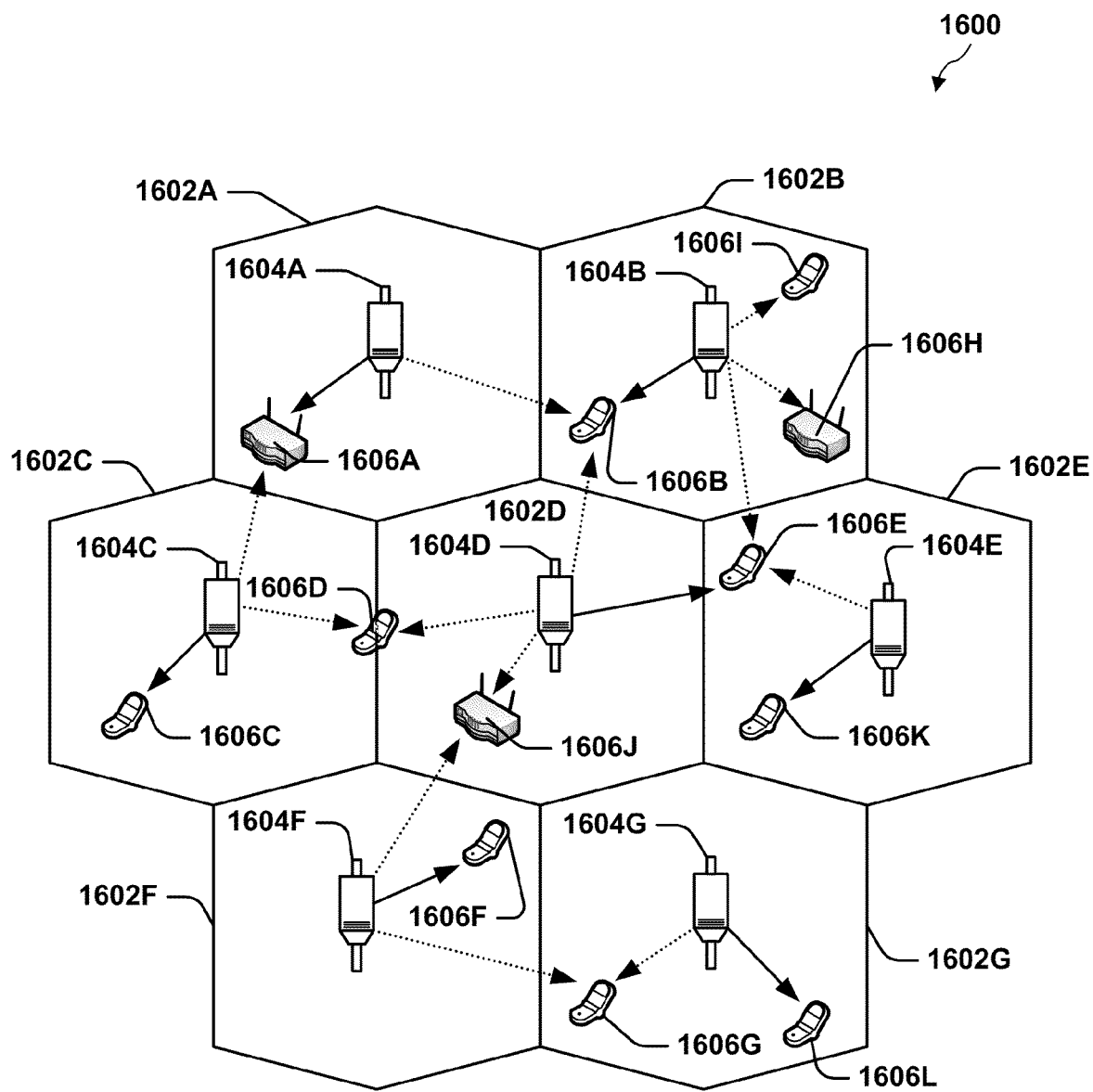
FIG. 16 illustrates a wireless communication system, configured to support a number of devices, in which the aspects herein can be implemented.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access node 1604 (e.g., access nodes 1604A-1604G). As shown in FIG. 16, access terminals 1606 (e.g., access terminals 1606A-1606L) can be dispersed at various locations throughout the system over time. Each access terminal 1606 can communicate with one or more access nodes 1604 on a forward link (FL) and/or a reverse link (RL) at a given moment, depending upon whether the access terminal 1606 is active and whether it is in soft handoff, for example. The wireless communication system 1600 can provide service over a large geographic region.

Figure 17:
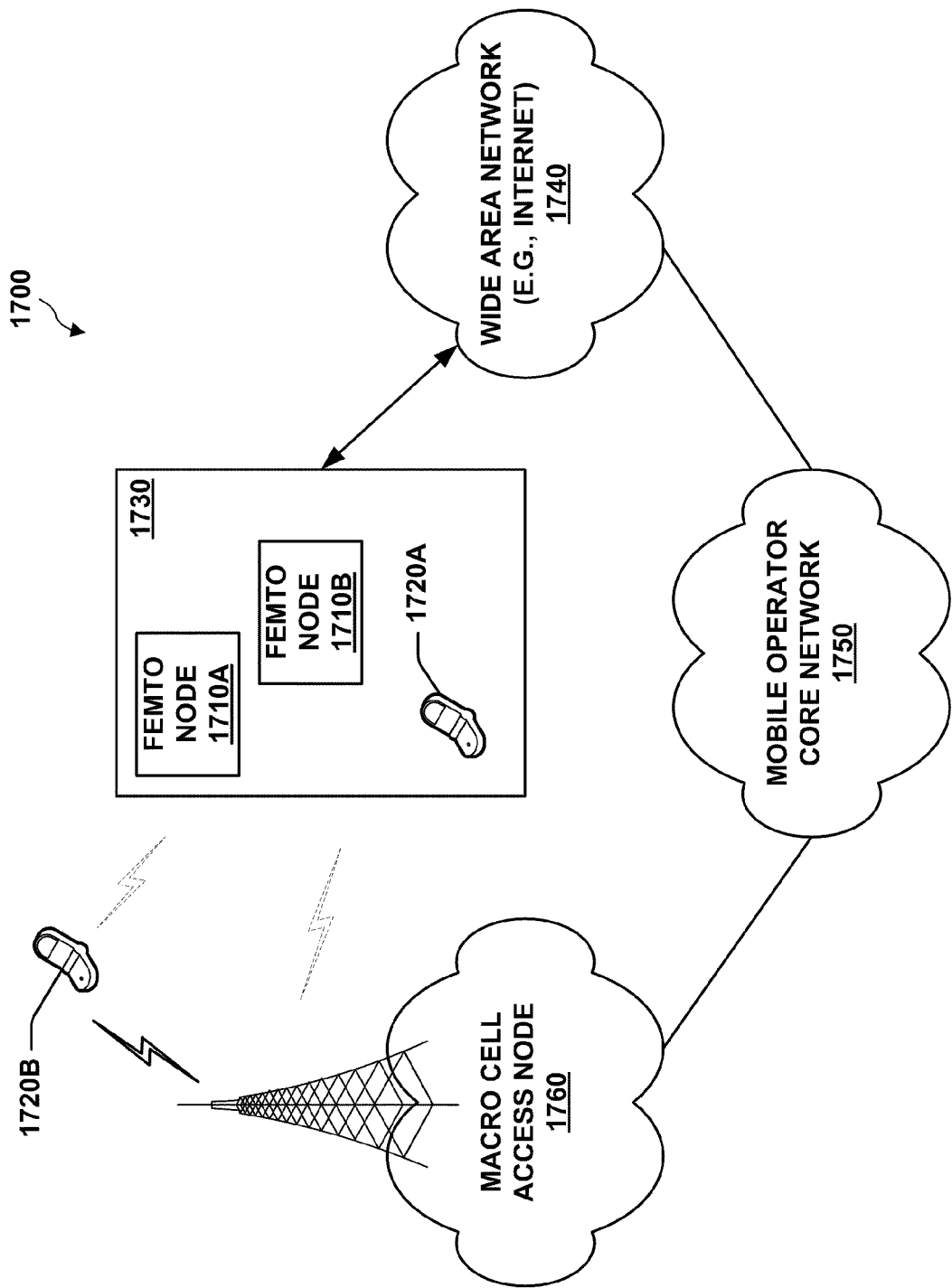
FIG. 17 illustrates an exemplary communication system to enable deployment of femtocells within a network environment.

FIG. 17 illustrates an exemplary communication system 1700 where one or more femto nodes are deployed within a network environment. Specifically, the system 1700 includes multiple femto nodes 1710A and 1710B (e.g., femtocell nodes or H(e)NB) installed in a relatively small scale network environment (e.g., in one or more user residences 1730). Each femto node 1710 can be coupled to a wide area network 1740 (e.g., the Internet) and a mobile operator core network 1750 via a digital subscriber line (DSL) router, a cable modem, a wireless link, or other connectivity means (not shown). As will be discussed below, each femto node 1710 can be configured to serve associated access terminals 1720 (e.g., access terminal 1720A) and, optionally, alien access terminals 1720 (e.g., access terminal 1720B). In other words, access to femto nodes 1710 can be restricted such that a given access terminal 1720 can be served by a set of designated (e.g., home) femto node(s) 1710 but may not be served by any non-designated femto nodes 1710 (e.g., a neighbor's femto node).

Figure 18:
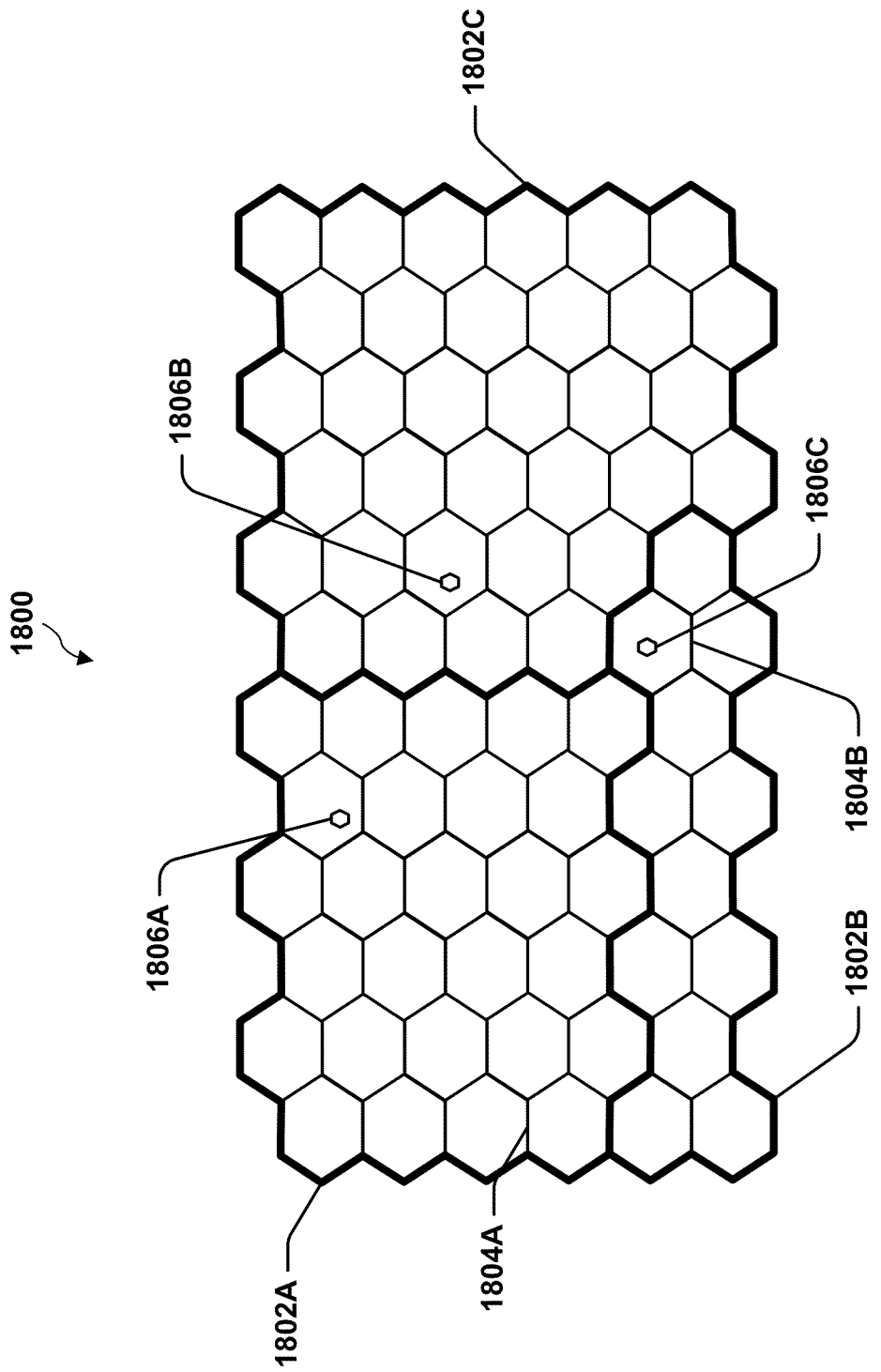
FIG. 18 illustrates an example of a coverage map having several defined tracking areas.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the hexagons. The tracking areas 1802 also include femto coverage areas 1806. In this example, each of the femto coverage areas 1806 (e.g., femto coverage area 1806C) is depicted within a macro coverage area 1804 (e.g., macro coverage area 1804B). It should be appreciated, however, that a femto coverage area 1806 may not lie entirely within a macro coverage area 1804. In practice, a large number of femto coverage areas 1806 can be defined with a given tracking area 1802 or macro coverage area 1804. Also, one or more pico coverage areas (not shown) can be defined within a given tracking area 1802 or macro coverage area 1804.

Referring again to FIG. 17, the owner of a femto node 1710 can subscribe to mobile service, such as, for example, 3G mobile service, offered through the mobile operator core network 1750. In addition, an access terminal 1720 can be capable of operating both in macro environments and in smaller scale (e.g., residential) network environments. Thus, for example, depending on the current location of the access terminal 1720, the access terminal 1720 can be served by an access node 1760 or by any one of a set of femto nodes 1710 (e.g., the femto nodes 1710A and 1710B that reside within a corresponding user residence 1730). For example, when a subscriber is outside his home, he is served by a standard macro cell access node (e.g., node 1760) and when the subscriber is at home, he is served by a femto node (e.g., node 1710A). Here, it should be appreciated that a femto node 1710 can be backward compatible with existing access terminals 1720.

A femto node 1710 can be deployed on a single frequency or, in the alternative, on multiple frequencies. Depending on the particular configuration, the single frequency or one or more of the multiple frequencies can overlap with one or more frequencies used by a macro cell access node (e.g., node 1760). In some aspects, an access terminal 1720 can be configured to connect to a preferred femto node (e.g., the home femto node of the access terminal 1720) whenever such connectivity is possible. For example, whenever the access terminal 1720 is within the user's residence 1730, it can communicate with the home femto node 1710.

In some aspects, if the access terminal 1720 operates within the mobile operator core network 1750 but is not residing on its most preferred network (e.g., as defined in a preferred roaming list), the access terminal 1720 can continue to search for the most preferred network (e.g., femto node 1710) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1720 can limit the search for specific band and channel. For example, the search for the most preferred system can be repeated periodically. Upon discovery of a preferred femto node, such as femto node 1710, the access terminal 1720 selects the femto node 1710 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1710 that reside within the corresponding user residence 1730). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for determining a set of closed subscriber group (CSG) cells to display, comprising:
    detecting signals from one or more CSG cells;
    receiving one or more indicators that specify whether access is allowed to CSGs in one or more visited networks, wherein the one or more indicators specify whether access is generally allowed to CSGs in visited networks, or whether access is allowed to CSGs in one or more specific visited networks;
    determining whether to display in a list of CSGs an identifier of one or more CSGs related to the one or more CSG cells based at least in part on the one or more indicators;
    suppressing the display of the identifier of the one or more CSGs in the list of CSGs when the one or more indicators specify that access is not generally allowed to the CSGs in visited networks; and
    displaying the identifier of the one or more CSGs in the list of CSGs when the one or more indicators specify that access is generally allowed to the CSGs in visited networks or when the one or more indicators do not specify that access is generally not allowed to the CSGs in the visited networks.

2. The method of claim 1, wherein the determining whether to display the identifier of one or more CSGs is further based at least in part on determining that the identifier of one or more CSGs is not in the list of CSGs.

3. The method of claim 2, wherein the list of CSGs is at least one of an operator CSG list, an allowed CSG list, or a combination thereof.

4. The method of claim 1, wherein the one or more specific visited networks are identified by a public land mobile network identifier in the one or more indicators.

5. The method of claim 1, further comprising receiving a request to display CSG cells for manual selection, wherein the determining whether to display is based at least in part on receiving the request.

6. An apparatus for determining a set of closed subscriber group (CSG) cells to display, comprising:
    at least one processor configured to:
        detect signals from one or more CSG cells;
        receive one or more indicators that specify whether access is allowed to CSGs in one or more visited networks, wherein the one or more indicators specify whether access is generally allowed to CSGs in visited networks, or whether access is allowed to CSGs in one or more specific visited networks;
        determine whether to display in a list of CSGs an identifier of one or more CSGs related to the one or more CSG cells based at least in part on the one or more indicators;
        suppress the display of the identifier of the one or more CSGs in the list of CSGs when the one or more indicators specify that access is not generally allowed to the CSGs in visited networks; and
        display the identifier of the one or more CSGs in the list of CSGs when the one or more indicators specify that access is generally allowed to the CSGs in visited networks or when the one or more indicators do not specify that access is generally not allowed to the CSGs in the visited networks; and
    a memory coupled to the at least one processor.

7. The apparatus of claim 6, wherein the at least one processor determines whether to display the identifier of one or more CSGs based at least in part on determining that the identifier of one or more CSGs is not in the list of CSGs.

8. The apparatus of claim 7, wherein the list of CSGs is at least one of an operator CSG list, an allowed CSG list, or a combination thereof.

9. The apparatus of claim 6, wherein the one or more specific visited networks are identified by a public land mobile network identifier in the one or more indicators.

10. The apparatus of claim 6, wherein the at least one processor is further configured to receive a request to display CSG cells for manual selection, and the at least one processor determines whether to display the identifier of one or more CSGs based at least in part on receiving the request.

11. An apparatus for determining a set of closed subscriber group (CSG) cells to display, comprising:
  means for detecting signals from one or more CSG cells;
  means for receiving one or more indicators that specify whether access is allowed to CSGs in one or more visited networks, wherein the one or more indicators specify whether access is generally allowed to CSGs in visited networks, or whether access is allowed to CSGs in one or more specific visited networks;
  means for determining whether to display in a list of CSGs an identifier of one or more CSGs related to the one or more CSG cells based at least in part on the one or more indicators;
  means for suppressing the display of the identifier of the one or more CSGs in the list of CSGs when the one or more indicators specify that access is not generally allowed to the CSGs in visited networks; and
  means for displaying the identifier of the one or more CSGs in the list of CSGs when the one or more indicators specify that access is generally allowed to the CSGs in visited networks or when the one or more indicators do not specify that access is generally not allowed to the CSGs in the visited networks.

12. The apparatus of claim 11, wherein the means for determining determines whether to display the identifier of one or more CSGs further based at least in part on determining that the identifier of one or more CSGs is not in the list of CSGs.

13. The apparatus of claim 12, wherein the list of CSGs is at least one of an operator CSG list, an allowed CSG list, or a combination thereof.

14. The apparatus of claim 11, wherein the one or more specific visited networks are identified by a public land mobile network identifier in the one or more indicators.

15. The apparatus of claim 11, wherein the means for detecting receives a request to display CSG cells for manual selection, and the means for determining determines whether to display based at least in part on the means for detecting receiving the request.

16. A computer program product for determining a set of closed subscriber group (CSG) cells to display, comprising:
  a non-transitory computer-readable medium, comprising:
    code for causing at least one computer to detect signals from one or more CSG cells;
    code for causing the at least one computer to receive one or more indicators that specify whether access is allowed to CSGs in one or more visited networks, wherein the one or more indicators specify whether access is generally allowed to CSGs in visited networks, or whether access is allowed to CSGs in one or more specific visited networks;
    code for causing the at least one computer to determine whether to display in a list of CSGs an identifier of one or more CSGs related to the one or more CSG cells based at least in part on the one or more indicators;
    code for causing the at least one computer to suppressing the display of the identifier of the one or more CSGs in the list of CSGs when the one or more indicators specify that access is not generally allowed to the CSGs in visited networks; and
    code for causing the at least one computer to display the identifier of the one or more CSGs in the list of CSGs when the one or more indicators specify that access is generally allowed to the CSGs in visited networks or when the one or more indicators do not specify that access is generally not allowed to the CSGs in the visited networks.

17. The computer program product of claim 16, wherein the code for causing the at least one computer to determine determines whether to display the identifier of one or more CSGs further based at least in part on determining that the identifier of one or more CSGs is not in the list of CSGs.

18. The computer program product of claim 17, wherein the list of CSGs is at least one of an operator CSG list, an allowed CSG list, or a combination thereof.

19. The computer program product of claim 16, wherein the one or more specific visited networks are identified by a public land mobile network identifier in the one or more indicators.

20. The computer program product of claim 16, wherein the computer-readable medium further comprises code for causing the at least one computer to receive a request to display CSG cells for manual selection, and the code for causing the at least one computer to determine determines whether to display based at least in part on the code for causing the at least one computer to receive the request receiving the request.

21. An apparatus for determining a set of closed subscriber group (CSG) cells to display, comprising:
  a neighboring access point detecting component for detecting signals from one or more CSG cells;
  a visited public land mobile network (VPLMN) component for receiving one or more indicators that specify whether access is allowed to CSGs in one or more visited networks, wherein the one or more indicators specify whether access is generally allowed to CSGs in visited networks, or whether access is allowed to CSGs in one or more specific visited networks;
  a list generating component for determining whether to display in a list of CSGs an identifier of one or more CSGs related to the one or more CSG cells based at least in part on the one or more indicators, wherein the list generating component is further configured to suppress the display of the identifier of the one or more CSGs in the list of CSGs when the one or more indicators specify that access is not generally allowed to the CSGs in visited networks; and
  a display component for displaying the identifier of the one or more CSGs in the list of CSGs when the one or more indicators specify that access is generally allowed to the CSGs in visited networks or when the one or more indicators do not specify that access is generally not allowed to the CSGs in the visited networks.

22. The apparatus of claim 21, wherein the list generating component determines whether to display the identifier of one or more CSGs further based at least in part on determining that the identifier of one or more CSGs is not in the list of CSGs.

23. The apparatus of claim 22, wherein the list of CSGs is at least one of an operator CSG list, an allowed CSG list, or a combination thereof.

24. The apparatus of claim 21, wherein the one or more specific visited networks are identified by a public land mobile network identifier in the one or more indicators.

25. The apparatus of claim 21, wherein the neighboring access point detecting component receives a request to display CSG cells for manual selection, and the list generating component determines whether to display based at least in part on the neighboring access point detecting component receiving the request.

* * * * *